United States Patent
Jamadar et al.

(10) Patent No.: US 12,525,650 B2
(45) Date of Patent: Jan. 13, 2026

(54) METHOD AND DEVICE FOR PRODUCING A CELL STACK FOR BATTERY CELLS

(71) Applicant: VOLKSWAGEN AKTIENGESELLSCHAFT, Wolfsburg (DE)

(72) Inventors: Kartik Jamadar, Wolfsburg (DE); Christian Theuerkauf, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 63 days.

(21) Appl. No.: 17/474,836

(22) Filed: Sep. 14, 2021

(65) Prior Publication Data

US 2022/0085404 A1     Mar. 17, 2022

(30) Foreign Application Priority Data

Sep. 15, 2020   (DE) .......................... 102020124039.2

(51) Int. Cl.
  *H01M 10/058*   (2010.01)
  *H01M 10/04*    (2006.01)

(52) U.S. Cl.
  CPC ......... *H01M 10/058* (2013.01); *H01M 10/04* (2013.01); *H01M 10/0404* (2013.01); *H01M 10/0413* (2013.01); *H01M 2220/20* (2013.01)

(58) Field of Classification Search
  CPC ............... H01M 10/058; H01M 10/04; H01M 10/0404; H01M 10/0413; H01M 2220/20
  See application file for complete search history.

(56) References Cited

U.S. PATENT DOCUMENTS

| | | | | |
|---|---|---|---|---|
| 5,025,551 A | * | 6/1991 | Rose | ..................... H01M 10/14 29/730 |
| 9,095,987 B2 | | 8/2015 | Min et al. | |

(Continued)

FOREIGN PATENT DOCUMENTS

| | | |
|---|---|---|
| CN | 103222096 A | 7/2013 |
| CN | 104067430 A | 9/2014 |

(Continued)

OTHER PUBLICATIONS

English Translation of EP 3300141 A1; Method for the preparation of an electrode stack for a battery cell and battery cell; Bosch GMBH Robert; Mar. 28, 2018 (Year: 2018).*

(Continued)

*Primary Examiner* — Adam J Francis
(74) *Attorney, Agent, or Firm* — PEARL COHEN ZEDEK LATZER BARATZ LLP

(57) ABSTRACT

A method for producing a cell stack (57) for battery cells (8) comprises at least the following steps: a) feeding in at least a first material strip (3) comprising a first material; b) feeding in a second material strip (22, 27) comprising a second material; c) making a first cut into the first material strip (3) and into the second material strip (22, 27), in each case forming at least one transport section (18) (having tensile strength), whereby the appertaining transport sections (18) are arranged offset in the crosswise direction relative to the material strip (3, 22, 27); d) combining the first material strip (3) and the second material strip (22, 27); and e) making a second cut, whereby the transport sections (18) of the first and second material strips (3, 22, 27) are cut independently of each other at separating cuts (14) that are offset, at least in the crosswise direction or in the lengthwise direction.

13 Claims, 22 Drawing Sheets

(56) References Cited

U.S. PATENT DOCUMENTS

| | | | |
|---|---|---|---|
| 9,385,394 | B2 | 7/2016 | Guenthart et al. |
| 10,985,427 | B2 | 4/2021 | Proell et al. |
| 10,991,070 | B2 | 4/2021 | Lee |
| 11,081,719 | B2 | 8/2021 | Sale et al. |
| 11,424,466 | B2 | 8/2022 | Reckers et al. |
| 11,479,437 | B2 | 10/2022 | Glodde et al. |
| 11,482,723 | B2 | 10/2022 | Omori et al. |
| 11,498,791 | B2 | 11/2022 | Rambusch et al. |
| 11,728,504 | B2 | 8/2023 | Alongi et al. |
| 11,742,497 | B2 | 8/2023 | Bihlmaier et al. |
| 2015/0129107 | A1* | 5/2015 | Miyazaki ............ B32B 38/1841 156/522 |
| 2016/0064724 | A1* | 3/2016 | Le Gal ................. H01M 4/043 156/64 |
| 2018/0323416 | A1* | 11/2018 | Schlund ............. H01M 50/463 |
| 2020/0365930 | A1* | 11/2020 | Alongi ............... H01M 10/0436 |

FOREIGN PATENT DOCUMENTS

| | | |
|---|---|---|
| CN | 104718654 A | 6/2015 |
| CN | 107000323 A | 8/2017 |
| CN | 107743663 A | 2/2018 |
| CN | 107851818 A | 3/2018 |
| CN | 107871893 A | 4/2018 |
| CN | 108899590 A | 11/2018 |
| CN | 109792071 A | 5/2019 |
| CN | 111033848 A | 4/2020 |
| CN | 111065702 A | 4/2020 |
| DE | 10 2013 203418 A1 | 9/2014 |
| DE | 10 2014 101 051 A1 | 7/2015 |
| DE | 10 2015 218 533 A1 | 11/2018 |
| DE | 10-2017216149 A1 | 3/2019 |
| EP | 1764196 A2 * 1/2009 ............... B26D 9/00 |
| EP | 2879223 A1 * 6/2015 ........ H01M 10/0404 |
| EP | 3300141 A1 * 3/2018 ........ H01M 10/0413 |
| EP | 3780212 A1 2/2021 |
| JP | 2019-102196 A 6/2019 |
| JP | 2019 125441 A 7/2019 |
| KR | 20130089373 A * 8/2013 ............ H01M 10/04 |
| KR | 10-2015-0035271 A 4/2015 |
| KR | 10 2019 0031232 A 3/2019 |
| KR | 20200031347 A 3/2020 |
| KR | 10-2101831 B1 4/2020 |
| KR | 102196103 B1 * 12/2020 |
| WO | WO 2019/048589 A1 3/2019 |
| WO | WO 2019/092585 A2 5/2019 |
| WO | WO 2019/188725 A1 10/2019 |

OTHER PUBLICATIONS

English Translation of KR 102196103 B1, Method of Manufacturing electrode assembly electrode assembly therefore and lithium secondary battery; RouteJade Inc; Dec. 29, 2020; priority date of Jul. 16, 2019 (Year: 2020).*
English Translation of KR20130089373A—Electrode assembly, method of manufacturing the same; Amogreentech Co; Aug. 12, 2013 (Year: 2013).*
English Translation of EP1764196A2—Method of separating flat material strips; Ehret Bernhard; Jan. 14, 2009 (Year: 2009).*
Search Report for Chinese Patent Application No. 202111042188.2, dated Jul. 17, 2024.
Office Action for U.S. Appl. No. 17/475,464 dated Jul. 19, 2023.
Office Action for U.S. Appl. No. 17/475,464 dated Feb. 23, 2024.
Office Action for U.S. Appl. No. 17/475,464 dated Jan. 6, 2025.
Office Action for U.S. Appl. No. 17/475,173, dated Jun. 29, 2023.
Office Action for U.S. Appl. No. 17/475,173, dated Jan. 3, 2024.
Office Action for U.S. Appl. No. 17/475,173, dated Nov. 20, 2024.

* cited by examiner

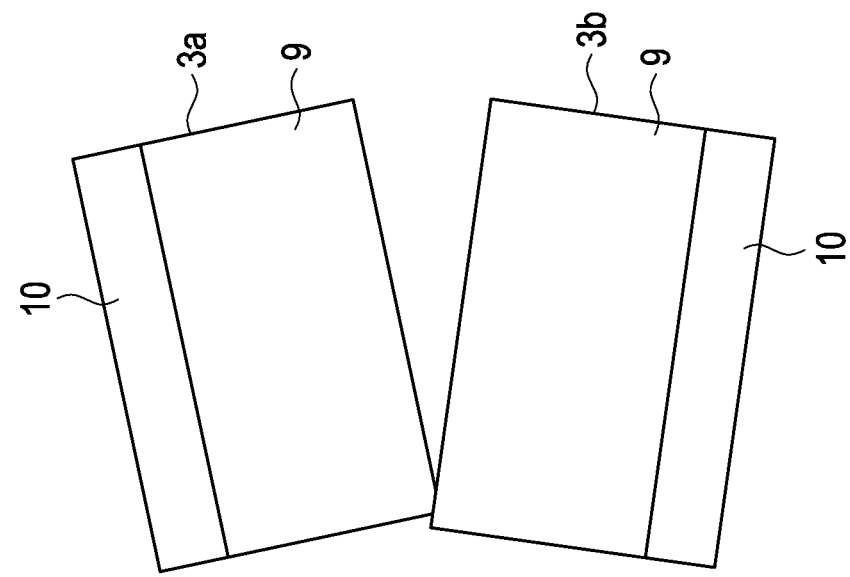
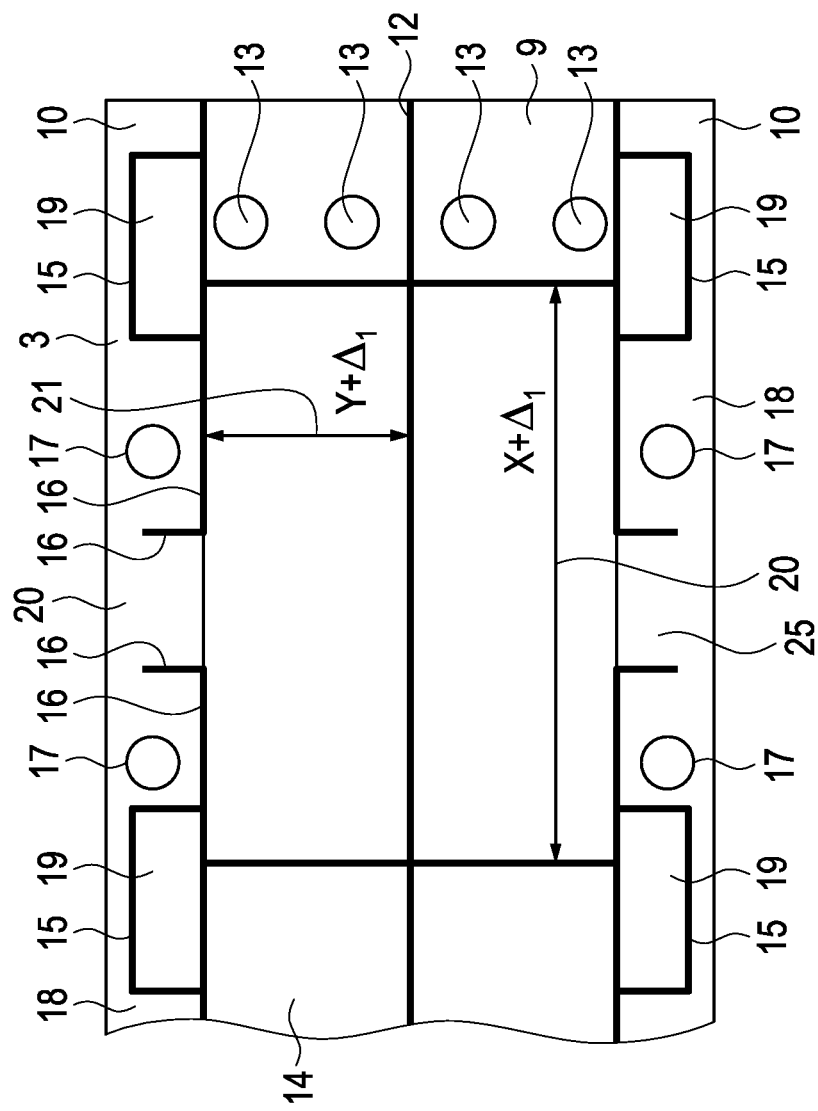
Fig. 3

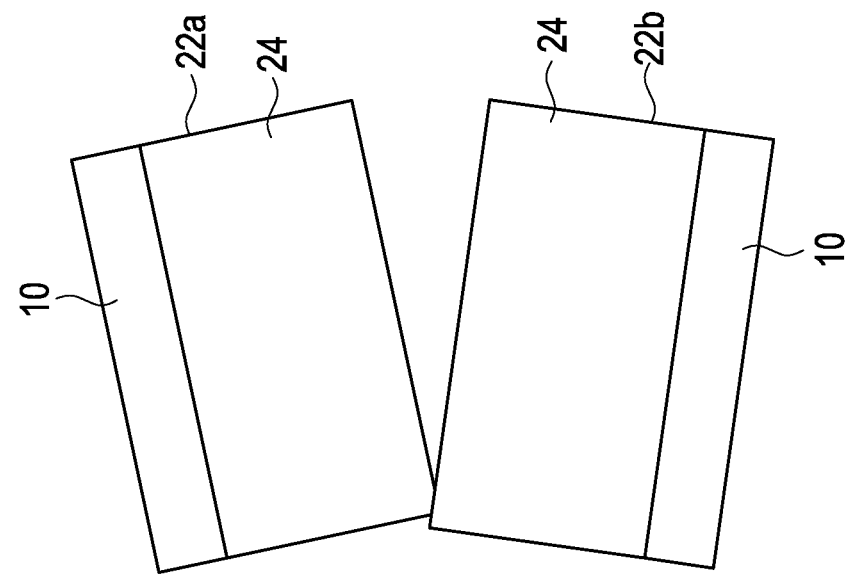
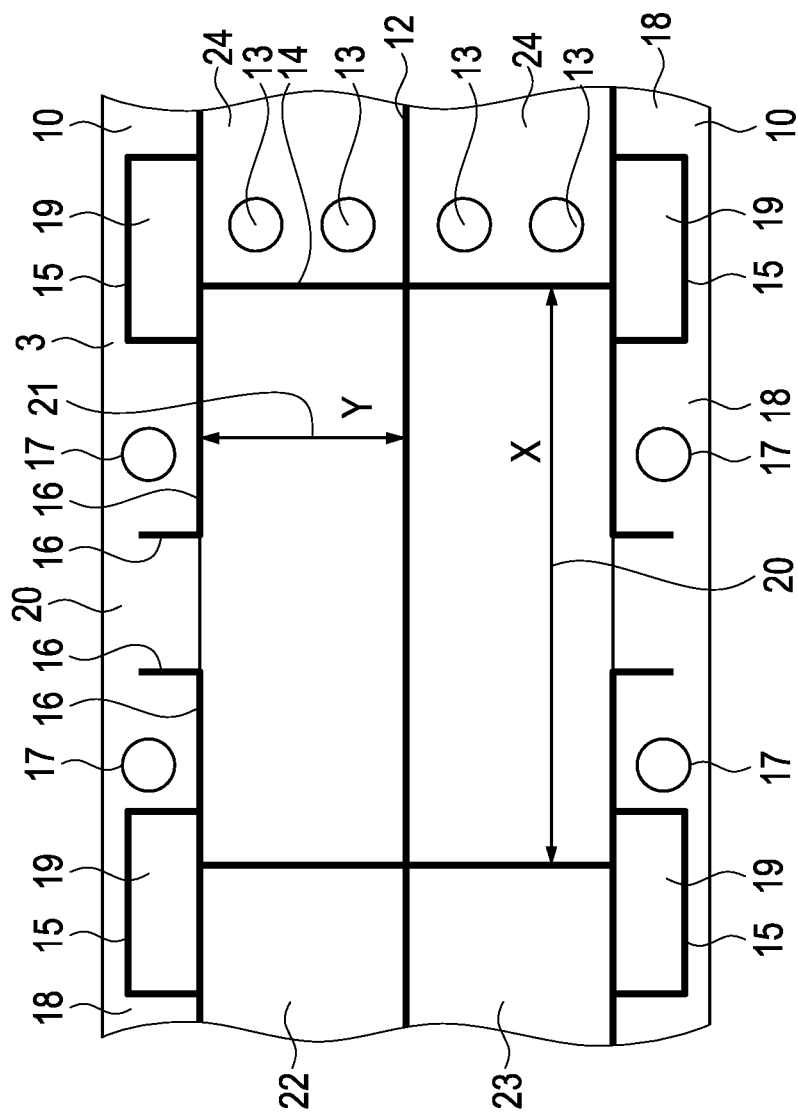
Fig. 4

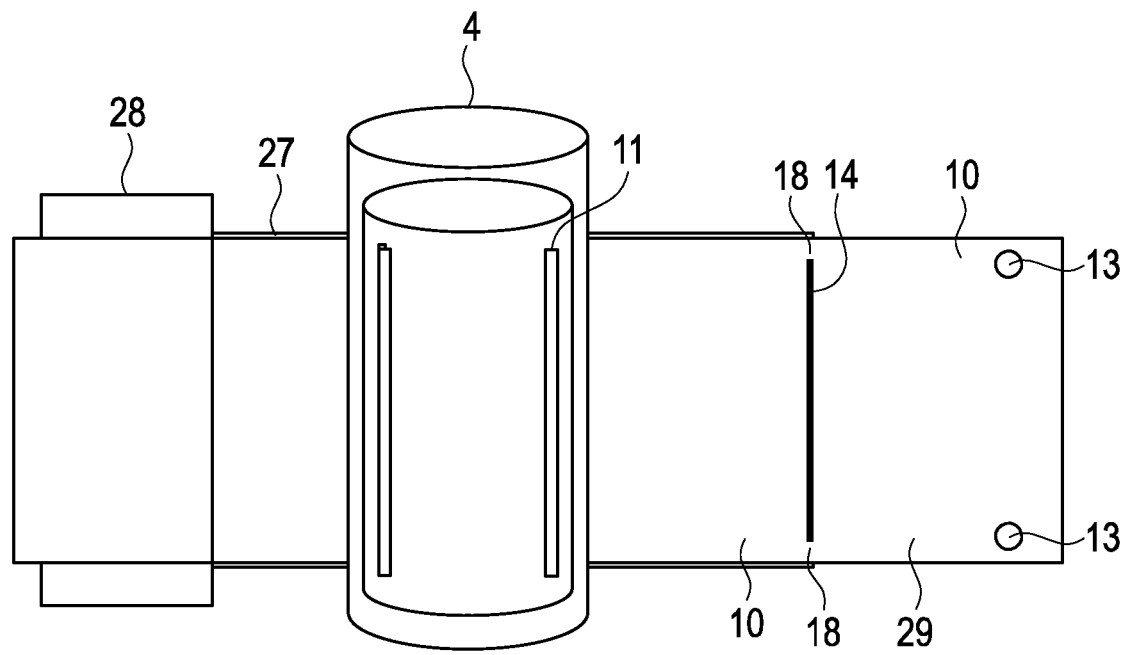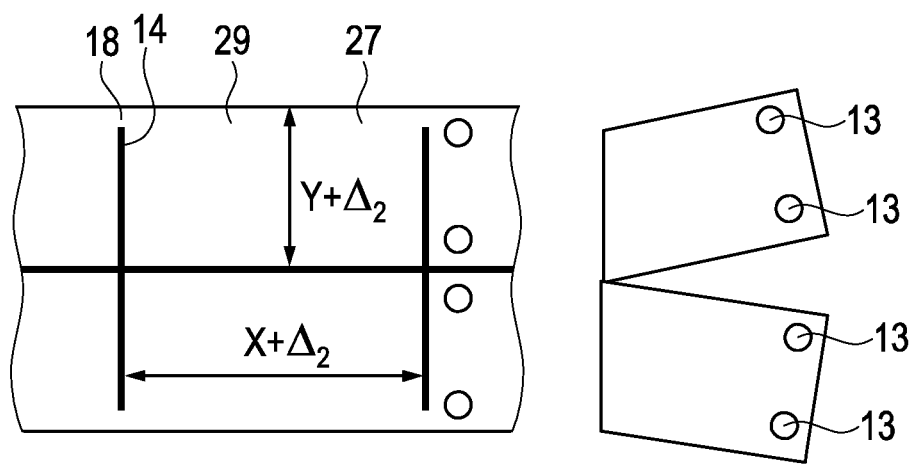
Fig. 6

METHOD AND DEVICE FOR PRODUCING A CELL STACK FOR BATTERY CELLS

CROSS REFERENCE TO RELATED APPLICATION

This application claims priority from German Patent Application No. 10 2020 124 039.2, filed on Sep. 15, 2020, which is hereby incorporated by reference ion its entirety.

FIELD OF THE INVENTION

The present invention relates to a method and to a device for producing a cell stack for battery cells.

BACKGROUND OF THE INVENTION

It is a known procedure from the state of the art to produce cell stacks for battery cells in that individual installations are used to individuate cathode sheets, anode sheets and separator sheets. The sheets produced in this manner are then each delivered individually and separately in magazines and positioned and aligned individually within the scope of an individual sheet stacking procedure during the formation of the stack. This process for producing a cell stack requires very high cycle times.

Another known method is so-called accordion folding in which a separator sheet is wrapped around individual electrode sheets, but these sheets likewise have to be first individuated and positioned in a preceding process step. It is also the case that accordion folding allows only relatively slow cycle times.

Moreover, it is a known procedure to form stacks by means of a lamination process. In order to achieve this, however, the cathode sheets and the anode sheets have to be laminated with separator films. However, the lamination-capable separator films needed for this purpose are relatively expensive.

The prior-art concepts entail various drawbacks. For instance, cell stack formation is currently a very slow process within the scope of the production of battery cells. Moreover, retaining the requisite position tolerances is currently extremely difficult to achieve during the stack formation process at short cycle times. Furthermore, separately preparing individual sheets for the cell stack, subsequently placing them into magazines, combining them, stacking them and joining them requires several process steps that each involve complicated handling of the material. The large number of process steps also calls for a greater complexity of the plant technology and only relatively slow cycle times can be attained.

Consequently, the objective of the present invention is to at least partially overcome the problems that arise from the state of the art. In particular, a method and a device are to be put forward with which a cell stack for battery cells can be produced very quickly. Moreover, the positioning accuracy of the material strips that are employed is to be improved and the complexity of the plant technology is to be reduced.

SUMMARY OF THE INVENTION

A method having the features of the independent claim contributes towards achieving these objectives. Advantageous refinements are the subject matter of the dependent patent claims. The features presented individually in the patent claims can be combined with each other in a technically meaningful manner and can be augmented by elucidating facts from the description and/or by details from the figures, whereby other embodiment variants of the invention are presented.

A method for producing a cell stack for battery cells is being proposed here, said method comprising at least the following steps:
  a) feeding in at least a first material strip comprising of a first material;
  b) feeding in a second material strip comprising a second material;
  c) making a first cut into the first material strip and into the second material strip, in each case forming at least one transport section (having tensile strength), whereby the appertaining transport sections are arranged offset in the crosswise direction relative to the material strip;
  d) combining the first material strip and the second material strip;
  e) making a second cut, whereby the transport sections of the first and second material strips are cut independently of each other at separating cuts that are offset, at least in the crosswise direction or in the lengthwise direction.

In this process, in method steps a) and b), initially at least a material strip comprising a first material and a second material strip comprising a second material are fed in. The appertaining material strip can be selected, for example, for use as an anode, as a cathode or as a separator of a battery cell. For an anode, a suitable substrate, for example, is one that is made of a material containing copper and that has an anode active layer applied onto it. Correspondingly, for example, a material containing aluminum is suitable as the substrate for a cathode active layer applied onto it. Flexible microporous plastics or nonwovens are options for separators.

The material strips can preferably be fed by supply means such as, for example, rolls or coils having large strip lengths, so that continuous, uninterrupted operation of the method is possible over a prolonged period of time.

For example, if a first material strip that is suitable for producing an anode is fed in, this strip can undergo a first cut by a first cutting device, whereby the cut is made in such a way that at least one transport section having tensile strength remains. In this context, the transport section should be configured such that it can absorb tensile forces in a lengthwise direction of the material strip. This makes it possible to process the material strip as a continuous material strip in the subsequent steps, since the forces needed for the further transport can be introduced into the transport section.

At the same time, the second material strip likewise undergoes a first cut so that a transport section is also formed on this material strip, said transport section being suited to absorb forces for the further transport and for the further processing. Here, however, the transport section of the second material strip is created in such a way that, after the subsequent combining of the material strips, said transport section is arranged offset transversally, that is to say, laterally and crosswise to the lengthwise direction of the material strip, relative to the transport section of the first material strip. In this manner, it becomes possible to make the cuts of the various material strips independently of each other.

During the further course of the method, the first material strip that has been thus cut is combined with the second material strip, for example, with a separator, in order to form a partial stack. In particular, the second material strip of the separator is also kept ready in a supply means, for example, as a separator coil, so that the process of making the first cut and combining the first and second material strips can be carried out at high speed. With the present invention, aside from the optional, transversally offset arrangement of the separating cuts, however, these cuts can also be made at various positions in the lengthwise direction of the material strips. This permits the material strips to be cut into different lengths during the continuous and uninterrupted manufacturing process.

After the combining step, the partial stack is then fed to a second cut, for which purpose the transport section once again serves as the point of attack for the drive forces.

The second cut of the partial stack can then be made by a second cutting device, whereby the appertaining transport section is then separated or transversally severed from the partial stack, as a result of which a complete separation of the partial stack in the transversal direction is effectuated.

The two-layered partial stack that has been formed and separated in this manner has, for example, an anode and a separator, and it can be arranged, for example, with additional two-layered partial stacks made up of cathodes and separators in order to form a cell stack.

As an alternative, instead of the two material strips described, it is also possible for several material strips to be combined after a first cut and to then undergo a second cut. In particular, the use of four material strips having the sequences consisting of the anode, the separator, the cathode, and the separator or else the cathode, the separator, the anode, and the separator is advantageous here since these four-layered partial stacks can be stacked directly on top of each other until the cell stack has the requisite number of anodes and cathodes.

This allows a very fast and precisely positioned production of cell stacks that entail far shorter manufacturing times than is the case with prior-art methods.

In particular, it can be provided that material strips are used that have different dimensions, at least in the crosswise direction. Here, for instance, the first material strip and the second material strip can be cut to different dimensions or they can already be delivered with the desired width. With an eye towards the safety of battery cells, separators have to protrude in all directions and to a sufficient extent beyond the anodes and cathodes that are to be insulated in order to reliably prevent a flow of current between these two material strips. Here, an oversize of the separator should extend all around beyond a cathode by approximately 3 mm and beyond an anode by approximately 1.5 mm. This means, for example, that the separator should be about 6 mm larger than the cathode and about 3 mm larger than the anode.

These different sizes can preferably already be created within the scope of the first cut by means of the first cutting devices that make an individual cut for each material strip. For this purpose, for example, the cathode is cut to the desired width relative to the width of the requisite transport section. At the same time, the anode is cut to the desired width plus an oversize of 3 mm, since it should preferably be larger than the cathode. Finally, the separator is cut to the desired width plus an oversize of 6 mm relative to the width of the cathode. It should be noted here that transversal cuts can also already have been made in all three material strips. The only important aspect here is that at least one transport section has to be retained that is suitable to absorb and transmit tensile forces that are acting in the lengthwise direction of the material strips. When it comes to all of the width dimensions, the width of the transport section—part of which is to be cut off again later—has to be taken into account accordingly. When the material strips are properly aligned laterally relative to each other, they can be combined and fed to the second cutting device for the second cut, so as to then yield individuated partial stacks that can be stacked on top of each other.

Especially advantageously, a window section can be created in at least one material strip and this section is selected in such a way that the separating cut of the transport section of at least one other material strip is within this window. This can preferably already be done during the first cut in that, for example, small windows or perforations are made in the material strip, and drives with pins, drive wheels or the like that are used for the further transport can later engage with or into these windows or perforations. If the position of the created windows of a material strip and the separating cut of the transport section of another material strip are selected in such a way that the latter falls within the window of the other material strip, then the strip-like transport section that falls within this window area and thus also the associated material strip can be cut at this place independently of the other material strip. For this purpose, a transversal separating cut that is already present but that is not yet continuous has to be extended only up to the edge of the material strip.

Therefore, this feature creates the option that two material strips that are arranged either directly or indirectly on top of each other can be cut independently of each other. Here, the location of the separating cuts can be at various positions in the transversal direction as well as in the lengthwise direction of the material strips.

In particular, as already described, after the second cut, at least two partial stacks can be arranged so as to form a cell stack.

The partial stacks can especially consist of at least four material strips. Here, particularly the combination of material strips in the form of two electrodes and two separators is advantageous. When possible combinations are made of these material strips, then the partial stacks made from them can be arranged on top of each other up to the required height of the cell stack, where it is then merely necessary to add a separator as the first or last material strip.

If the combination of an anode, a separator, a cathode, and a separator arranged on top of each other is selected, then a single separator has to be put in place when the partial stack starts to be arranged, since otherwise the bottom anode would not be insulated.

If instead, the combination in which the selected sequence of the material strips arranged on top of each other is the separator, the anode, the separator, and the cathode, then a single separator has to be put in place when the arranging of the partial stack has been completed, since otherwise the top cathode would not be insulated.

In particular, arrester lugs can already be formed on at least two material strips during the cutting. This lends itself especially in the case of the material strips of the anodes and cathodes. Here, the arresters can be formed completely and without additional work during the first and second cuts by simply selecting an appropriate and suitable cut contour.

In particular, in an immediately subsequent method step, the cell stack produced according to the present method can be joined to form a cell packet using a joining means such as, for example, an adhesive strip or tape. This additional step is very easy to add to the present method as an additional method step.

When it comes to the automatic arranging, it is especially advantageous if at least one additional material strip is arranged in the cell stack while the partial packets are being arranged to form the cell stack. As already described above, this material strip can be inserted into the cell stack, either at the bottom of the cell packet and thus at the beginning of the arranging of the partial stack or else at the top of the cell packet and thus at the end of the arranging of the partial stack.

A battery cell having a cell stack, produced according to one of the preceding claims, has the advantage that it can be produced cost-effectively, and thanks to the automated and continuous processing, individual material strips are arranged with good positioning accuracy relative to each other. This lowers the costs and increases the service life and reliability of the battery cell.

This also applies especially to a motor vehicle having at least one battery cell according to the preceding claim.

In particular, the invention can be implemented with a device for producing a cell stack having at least two supply means for at least a first and a second material strip, having at least a first and a second cutting device for cutting the material strip, having a transport means for conveying the material strips, having an apparatus for combining the material strips and having a stacking unit, whereby the first cutting device creates a strip-like transport section, the second cutting device is arranged in a conveying direction downstream from the apparatus for combining the material strips, and said second cutting device is configured to make a cut into the material strips that is completely transversal and offset in the conveying direction.

In particular, it can be provided that the first cutting device and the second cutting device are configured to cut at least two combined material strips, as a result of which the production time can be considerably reduced when the first and second cuts are made at the same time and not consecutively on as many material strips as possible.

In particular, it can also be provided that the second cutting device is configured to make a longitudinal cut of an edge area into at least one material strip. This is advantageous, for instance, if a transport section arranged at the side is to be cut off when the second cut is being made.

Moreover, within the scope of the invention, the device for producing a cell stack can have at least two supply means for at least a first material strip and a second material strip, at least a first cutting device and a second cutting device for cutting the material strip, as well as a transport means for conveying the material strips. Moreover, the device has an apparatus for combining the material strips and a stacking unit, whereby the first cutting device creates at least one strip-like transport section having tensile strength, the second cutting device is arranged in a lengthwise direction downstream from the apparatus for combining the material strips, and said second cutting device is configured to make a completely transversal cut into the material strips. As seen in the lengthwise direction, the transport section is preferably formed on the outer edge of the material strip and it has a width of less than 25% of the width of the material strip. If several transport sections are provided on different material strips, then they preferably have to be arranged relative to each other so as to be transversally offset to the lengthwise direction.

In particular, the first cutting device can be configured to undertake parallel cutting of at least two material strips.

Moreover, it can be provided for the first cutting device to be configured to cut at least one material strip parallel to the lengthwise direction in a plurality of material strips. As a result, it is also possible to process wider material strips, for example, in the first cutting device. Here, the desired first cut is preferably made initially, and then the material strip is divided so as to acquire the requisite width. Thus, for example, material strips for separators can be cut that have twice the width of the required separator. If, during the first cut, this wide material strip is now divided into two material strips of separators, then these two material strips can be continuously and uninterruptedly further processed immediately within the scope of a partial stack comprising two electrodes and two separators.

For the sake of clarity, it should be pointed out that the numerals used here ("first", "second", etc.) serve primarily (only) to differentiate among several similar objects, dimensions or processes, in other words, they especially do not necessarily prescribe a dependence and/or sequence of these objects, dimensions or processes relative to each other. If such a dependence and/or sequence is/are necessary, this is explicitly pointed out here or else it is obvious to the person skilled in the art upon studying the concretely described embodiment.

BRIEF DESCRIPTION OF THE DRAWINGS

The invention as well as the technical field will be explained in greater detail below on the basis of the accompanying figures. It should be pointed out that the invention is not restricted to the embodiments presented. In particular, unless not explicitly indicated otherwise, it is also possible for partial aspects of the facts elaborated upon in the figures to be extracted and to be combined with other components and insights stemming from the present description. In particular, it should be mentioned that the figures and especially the size ratios presented are only of a schematic nature. The following is shown:

FIG. 3: a top view of an anode after the first cut;

FIG. 4: a top view of a cathode after the first cut;

FIG. 6: a top view of two conceivable cuts for a separator;

DETAILED DESCRIPTION OF THE INVENTION

Figure 1:
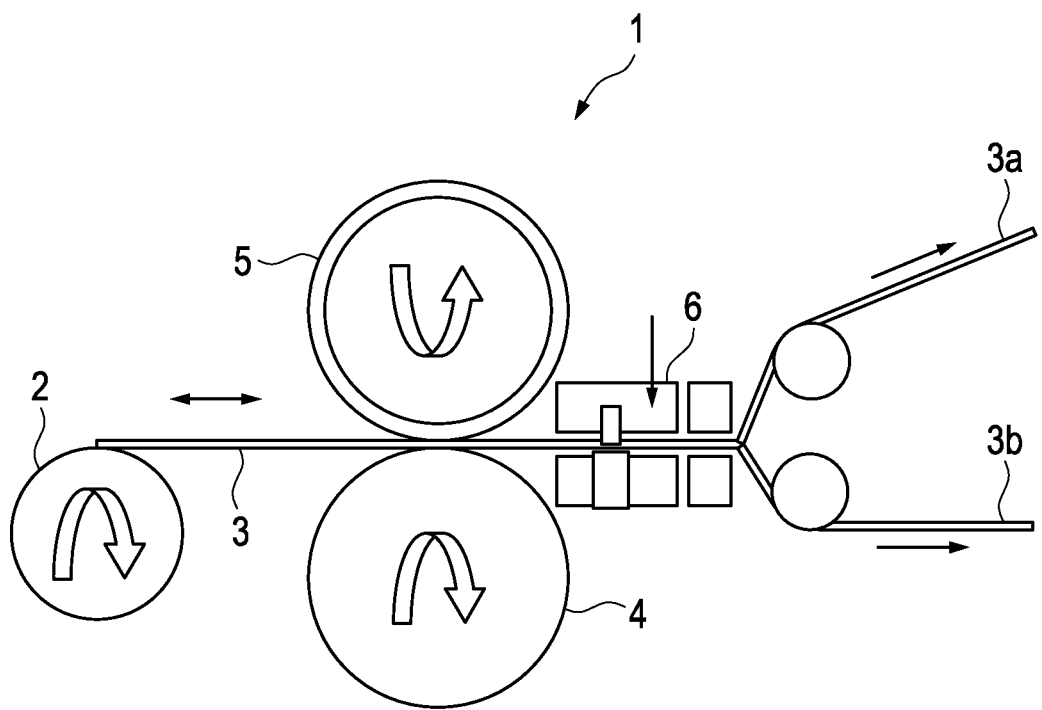
FIG. 1: a side sectional view of a first cutting device for an anode.

FIG. 1 shows a first cutting device 1 in a side view. On the left-hand side of FIG. 1, there is a first supply means 2 that contains a supply of a first material strip 3. The first supply means 2 can be, for instance, a pre-manufactured unit comprising a calendered mother coil with a first material strip 3, for example, for an anode 7 of a battery cell 8. The calendered first material strip 3—which has been rolled up into a coil—has a highly uniform layer thickness and is fed to the first cutting device 1 at the most constant and defined tensile forces possible in order to avoid creasing in the first material strip 3. The first cutting device 1 consists of a bottom roller 4, a top roller 5 as well as well as a perforating unit 6. The cut made in the first cutting device 1 will be elaborated upon below. In the embodiment shown here, the first material strip 3 has a width that has been selected in such a way that the material strip 3 can be divided in the lengthwise direction during the cut, so that two first material strips 3a, 3b are simultaneously created in the first cutting device 1 and they can then subsequently be further processed. As an alternative to the embodiment shown here, in which the first material strip 3 has a width that corresponds to twice the width of a first material strip 3a, 3b that has been cut to size, however, it is also easily possible to use a first material strip 3 that corresponds to the single width or multiple widths of the first material strip 3a, 3b that has been cut. In the latter case, a corresponding number of separating cuts would have to be made in the lengthwise direction of the material strip 3. For purposes of making the cut, the bottom roller 4 can be made, for example, of a hardened material such as, for instance, tungsten carbide or chromium steel. The perforating unit 6 is configured in the form of a punch that is suitable for punching holes into the appertaining divided first material strip 3a, 3b.

Figure 2:
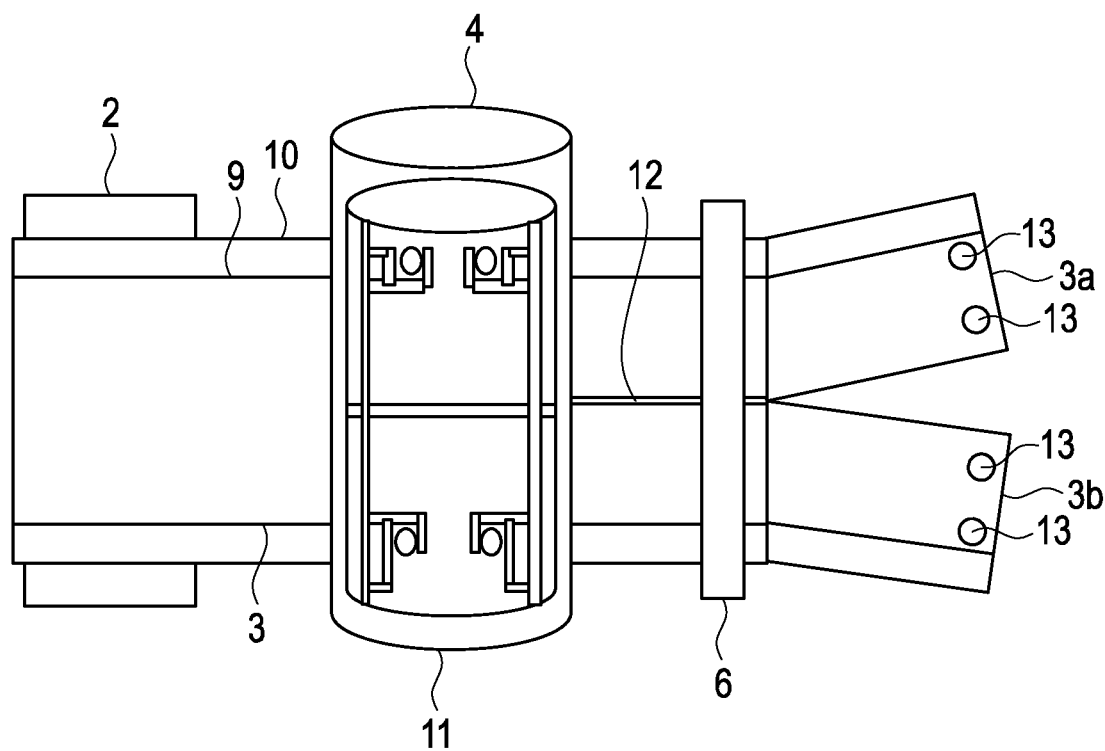
FIG. 2: a top view of the cutting device shown in FIG. 1.

FIG. 2 depicts a top view of the first cutting device 1 shown in FIG. 1. Starting from the first supply means 2, which is arranged on the left-hand side, the first material strip 3 is fed towards the right to the depicted bottom roller 4. The first material strip 3 has an anode area 9 and an edge 10. The anode area 9 is coated with a material that is suitable for later utilization as the anode 7 in a battery cell 8, namely, a so-called anode active layer. The substrate of the anode is preferably a copper material. In this context, it can be clearly seen that the first material strip 3 is twice as wide as the first material strips 3a, 3b after the first cut. The bottom roller 4 has a rotary blade 11 that creates a longitudinal cut 12 in the middle of the material strip 3. Subsequently, the perforating unit 6 creates the receiving holes 13 which form a defined starting point of the material strip 3 or of the divided material strip 3a, 3b.

FIG. 3 shows an alternative embodiment of the invention in which the first cutting device 1 makes a more complex cut of the first material strip 3. In this embodiment—aside from the longitudinal cut 12 which runs lengthwise—during the first cut, the first cutting device 1 makes a transversal separating cut 14, a window cut 15, a two-part arrester cut 16 as well as transport holes 17 into the first material strip 3. For this purpose, it is merely necessary for the rotary blades 11 arranged in the bottom roller 4 to be designed with an appropriate cutting contour.

In this context, it is important for the edge 10 not to be completely severed anywhere in the transversal direction. Only by retaining a continuous connection can the edge 10 fulfill its function as a transport section 18 and can it absorb and transmit tensile forces in the lengthwise direction of the first material strip 3. Such transport forces can be transmitted to the transport section 18, for example, by means of rollers. As an alternative, however, mechanical elements can also engage with the transport holes 17, thereby conveying the first material strip 3 continuously, quickly and without interruptions and with a high level of precision.

Furthermore, the windows 19 created by means of the window cuts 15 are significant for the invention since strips of material situated underneath or above them can be cut through these windows 22.

The separating cut 14 that has already been made in this place is made in the lengthwise direction 20 at a distance of $X+\Delta_1$. This means that the anode 7 that is finished later will have a length of $X+\Delta_1$. Accordingly, a width 21 of the anode 7 will have a measurement of $Y+\Delta_1$, which corresponds essentially to the width of the inside section of the arrester cut 16, which is at a distance from the edge 10. The two transversal sections of the arrester cuts 16 that are arranged next to each other in a transport section 18 already define the width of an arrester 25 of the electrode that is to be created later and that, in this case, is an anode 7. Whereas the receiving holes 13 are only needed when a material strip 3 is positioned for the first time, the transport holes 17 can be used continuously, that is to say, during the entire production process, in order to transmit drive forces as well as to precisely position the material strip 3.

FIG. 4 shows a second material strip 22 that undergoes a first cut that essentially corresponds to the cut illustrated in FIG. 3. The difference in the embodiment shown in this figure is that this is a cathode 23. For this purpose, the second material strip 22 is initially fed to the first cutting device 1 from a second supply means 26. In this context, it is particularly efficient if several first cutting devices are employed in parallel in order to simultaneously make the first cut into the first material strips 3 of anodes 7 and into the second material strips 22 of cathodes 23.

In order to be used as cathode 23, the transport section 18 with its edge 10 and a cathode area 24 are made of appropriate materials that are suitable for the cathode 23 of a battery cell 8. For this purpose, for instance, an aluminum substrate can be employed as the support for a cathode active material. Another difference from the anode 7 is that the length of the cathode 23 in the lengthwise direction 20 and its width 21 are slightly smaller than the length in the lengthwise direction 20 and the width 21 of the anode 7 shown in FIG. 3. In the embodiments shown, the anode 7 is larger than the cathode 23 by the differential dimension $\Delta_1$. This applies to the lengthwise direction 20 as well as to the direction of the width 21.

The separate second material strips 22a, 22b resulting from the first cut can then be further processed directly and separately from each other.

Figure 5:
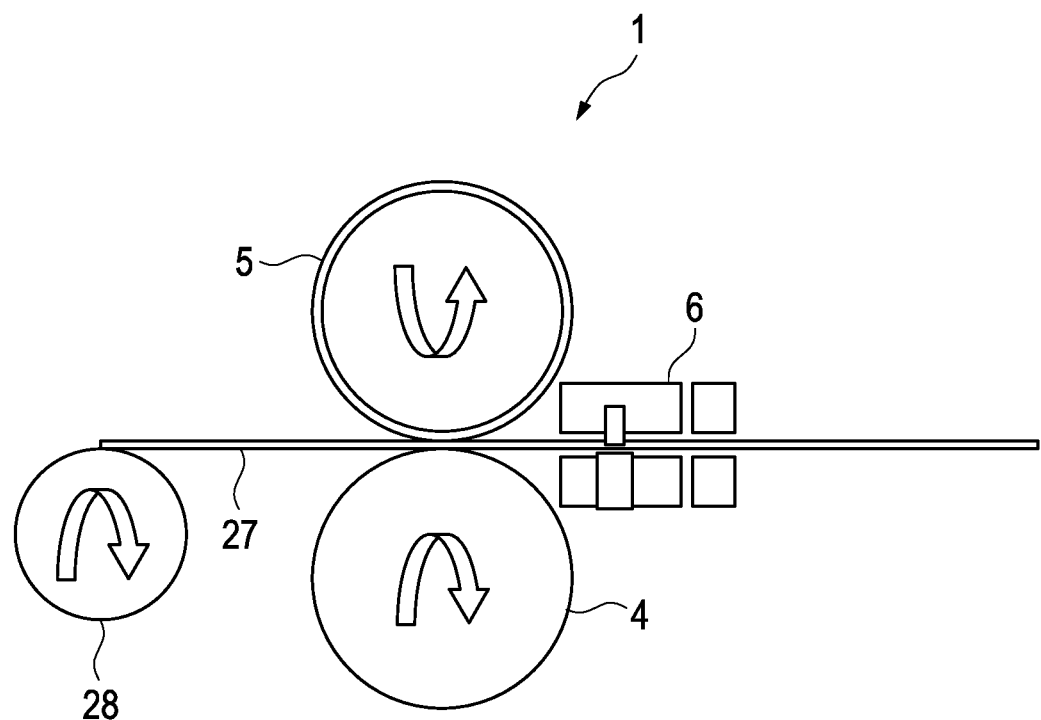
FIG. 5: a side sectional view of a first cutting device for a separator.

FIG. 5 shows another first cutting device 1 to which a third strip of material 27 is fed from a third supply means 28. The third strip of material 27 is a separator 29 that has insulating properties and that is suitable for electrically insulating anodes 7 and cathodes 23 from each other. The third strip of material 27, in turn, undergoes a first cut using a bottom roller 4 and a top roller 5. A perforating unit 6 is likewise provided in order to create receiving holes 13.

The upper area of FIG. 6 shows a view from below of the bottom roller 4, whereby the perforating unit 6 is not depicted. In this embodiment, the bottom roller 4 has a rotary blade 11 that is configured to make transversal separating cuts 14 at defined places of the third strip of material 27, whereby, however, these separating cuts 14 do not extend over the entire width of the third strip of material 27, but rather, they skip an edge 10. As a result, transport sections 18 that can absorb tensile forces are created in the edge 10 on both sides of the third strip of material 27, thus allowing further mechanical processing of the third strip of material 27 in the continuous, uncut state. Moreover, the perforating unit 6 not shown in this figure creates receiving holes 13 in the third strip of material 27.

The lower area of FIG. 6 shows a variant in which the third strip of material 27 is twice as wide as the width of the separator 29 needed for the battery cell 8. In this case, the bottom roller 4 can be configured, for example, in such a way that, in addition to the transversal separating cut 14, it also makes a lengthwise longitudinal cut 12 and cuts the third strip of material 27 into two halves in its length. For purposes of attaining safe operation of a battery cell 8, it is advantageous for the separator 29 to be larger than the anode 7 or cathode 23 that is to be insulated. For this reason, starting with the above-mentioned basic dimensions X and Y of the cathode 23, the separator 29 is cut to a width of Y+$\Delta_2$ and to a length of X+$\Delta_2$. In this context, $\Delta_2$ constitutes the oversize by which the separator 29 is supposed to be larger than the cathode 23.

Figure 7:
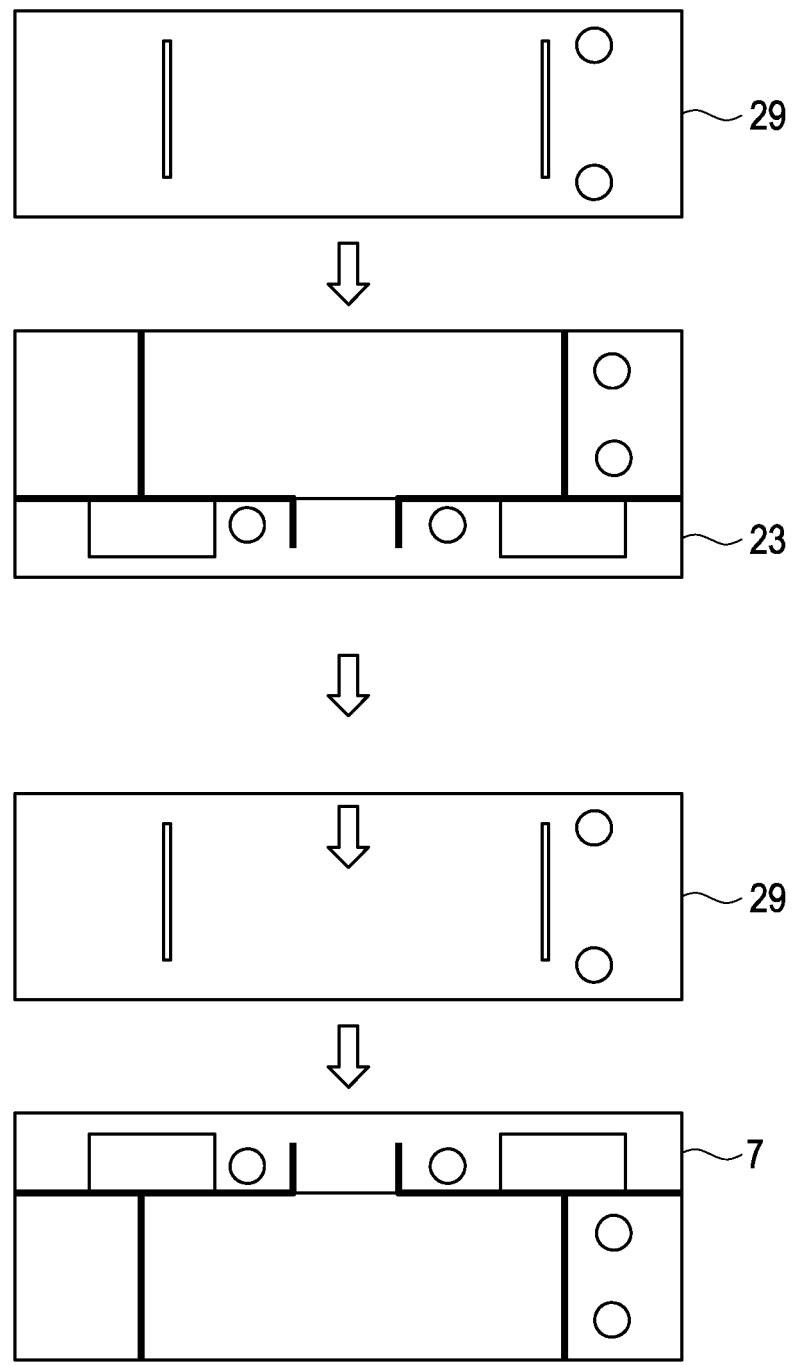
FIG. 7: a conceivable combination of four strips of material.

FIG. 7 shows four strips of material that are combined on top each other to form a partial stack. As seen from the bottom to the top, this consists of an anode 7, a separator 29, a cathode 23 and another separator 29. In the state shown, all of the strips of material have already undergone a first cut.

Figure 8:
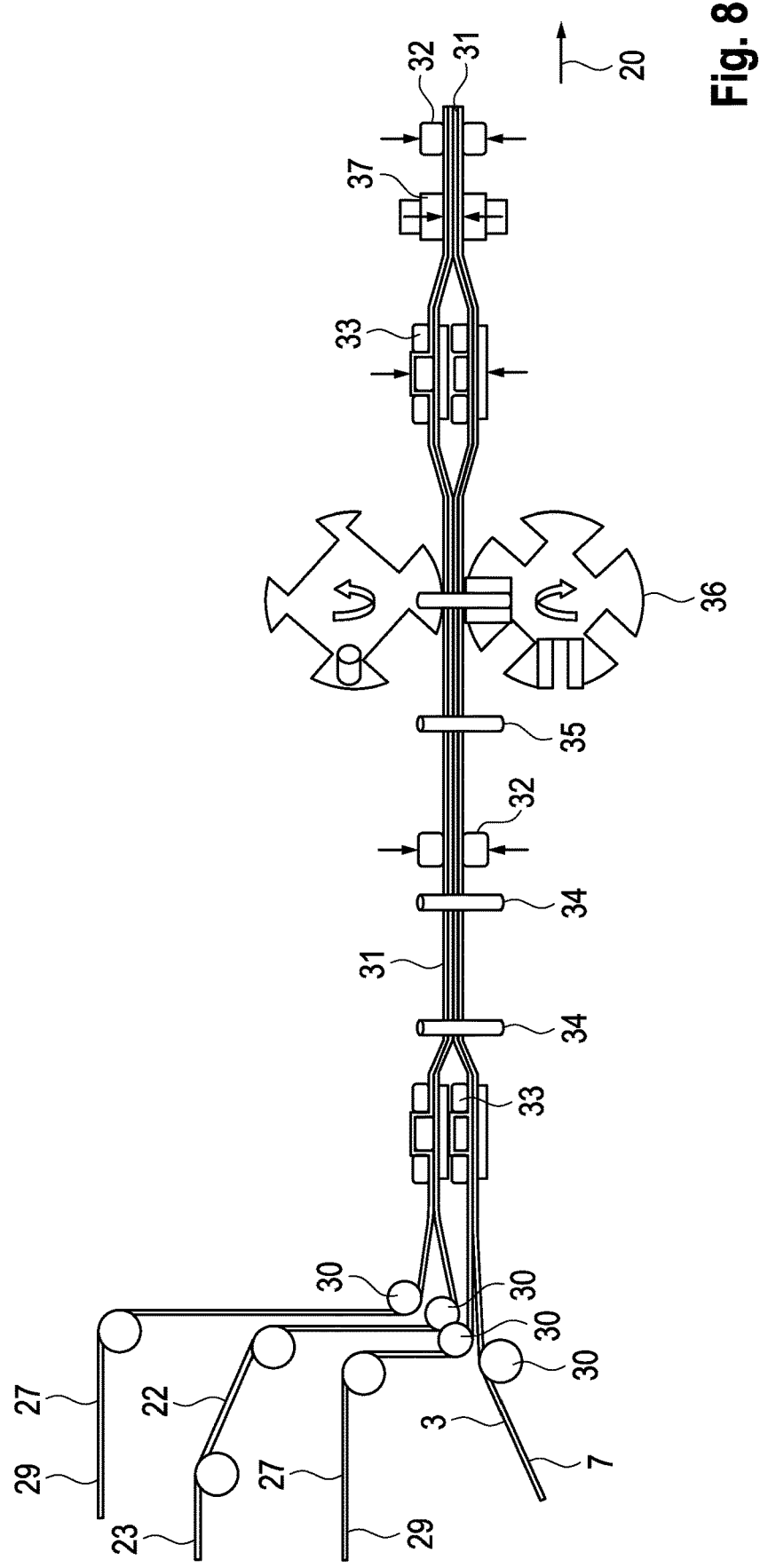
FIG. 8: a side view of the process from the point in time when the strips of material were combined.

FIG. 8 shows the subsequent method step in a side view. As seen coming from the left-hand side and in the state after the first cut, a first material strip 3, a second material strip 22 as well as two third strips of material 27 are fed in such a way that a third strip of material 27 is arranged between the first material strip 3 and the second material strip 22, while another third strip of material is situated on top of the second material strip 22. In this process, the four material strips 3, 27, 22 are combined by means of guide means 30 to form a partial stack 31. Here, a first clamping apparatus 32 engages with the right-hand end of the partial stack 31 while a second clamping apparatus 33 engages with the left-hand end of the partial stack 31. The mode of operation of the clamping apparatuses 32 and 33 will be elaborated upon below. The further transport of the partial stack 31 in the lengthwise direction 20 is carried out by transport pins 34 that engage with the transport holes 17 of the first material strip 3 and of the second material strip 22. The transport pins 34 are driven by a drive means not shown here and they exert a drive force onto the appertaining transport section 18. For the initial placement of a strip of material, there are also receiving pins 35 that engage with the receiving holes 13 and that are coordinated in such a way that the strip of material that is to be newly put in place and its cut contour stemming from the first cut are precisely fed in a defined position. Over the further course, this is followed by a cam drive 36 which, on the one hand, is configured to drive the transport pins 34 or the receiving pins 35 and, on the other hand, to allow a smooth passage through the first clamping apparatus 32 and through the second clamping apparatus 33 so as to reach the position situated further to the right, where a third clamping apparatus 37 is then placed against the partial stack 31.

Figure 9:
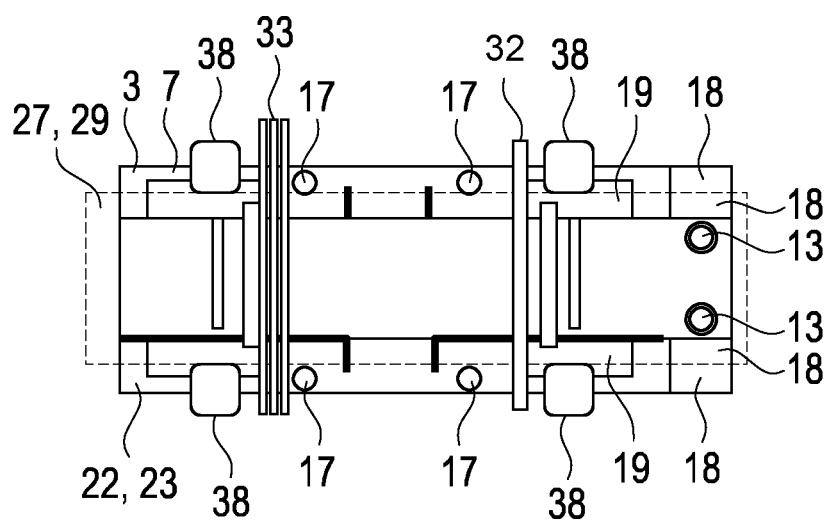
FIG. 9: a top view of four combined strips of material.

FIG. 9 shows the partial stack 31 of FIG. 8 once again in a top view. The first clamping apparatus 32 and the second clamping apparatus 33 can be clearly seen here. In this context, it can also be clearly seen that the transport sections 18 of the anode 7, of the cathode 23 and of the separators 29 are arranged offset in the transversal direction, that is to say, in the crosswise direction. In particular, this causes the transport section 18 of the separators 29 to be located in the anode 7 or in the cathode 23 completely inside the windows 19. In order to always ensure a correct transversal orientation of the strips of material, a monitoring instrument 38 is provided which can be configured, for instance, as a position detector or as an optical strip-edge regulator for controlling the width of the separator 29.

Figure 10:
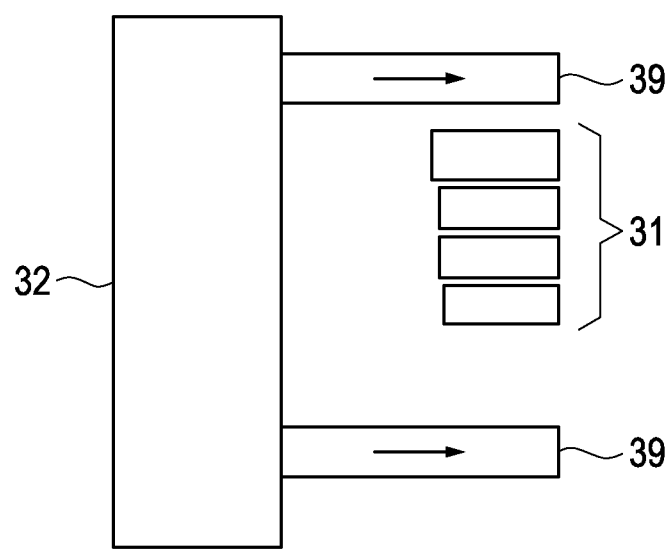
FIG. 10: the gripping manner of the first clamping apparatus.

FIG. 10 shows the first clamping apparatus 32 in a sectional view in the lengthwise direction 20 of the partial stack 31. When the clamping apparatus 32 is put in place, two grippers 39 are brought into position above and below the partial stack 31.

Figure 11:
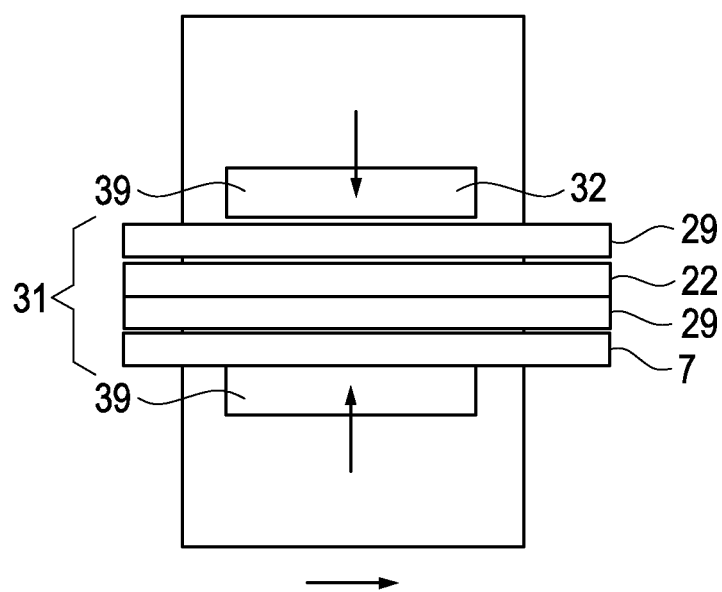
FIG. 11: the closing of the first clamping apparatus.

FIG. 11 then shows the first clamping apparatus 32 in a closed state in which the grippers 39 are to be moved towards each other, thereby firmly clamping the partial stack 31 in this process. This ensures that no movement of the material strips 3, 22, 27 relative to each other can occur during the subsequent processing.

Figure 12:
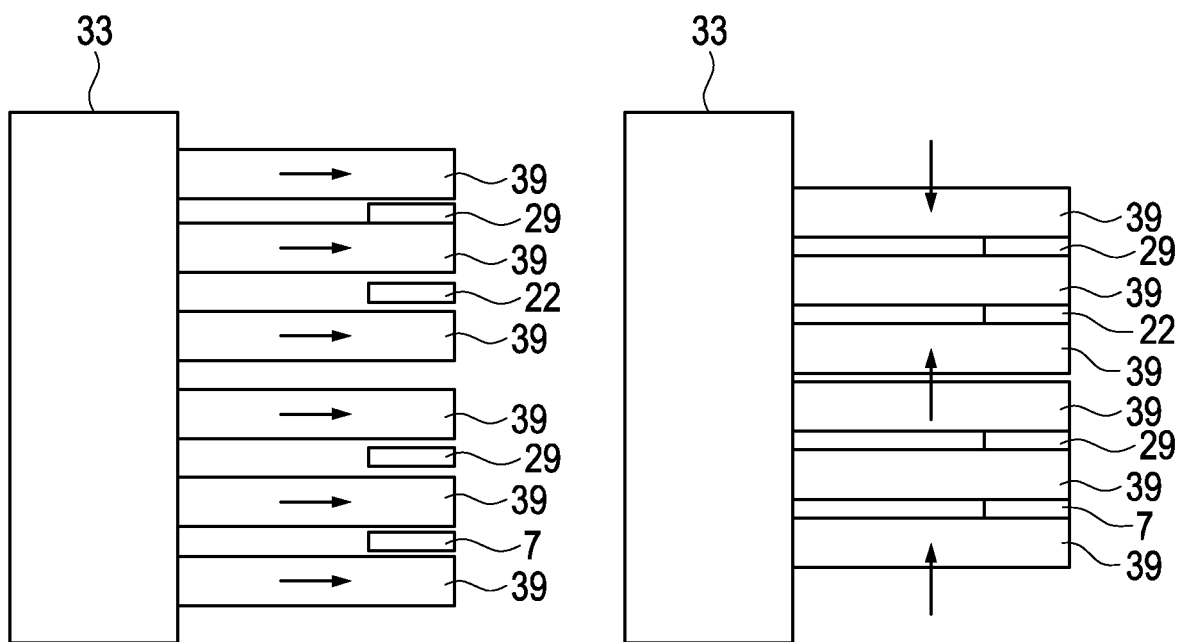
FIG. 12: the gripping manner of the second clamping apparatus.

FIG. 12 shows the second clamping apparatus 33 in an open state on the left-hand side, and in a closed state on the right-hand side. When the second clamping apparatus 33 is put in place, several grippers 39 are inserted from the side between the material strips 3, 22, 27. Once this has taken place, the grippers 39 are, in turn, moved towards each other in order to close the second clamping apparatus 33.

Figure 13:
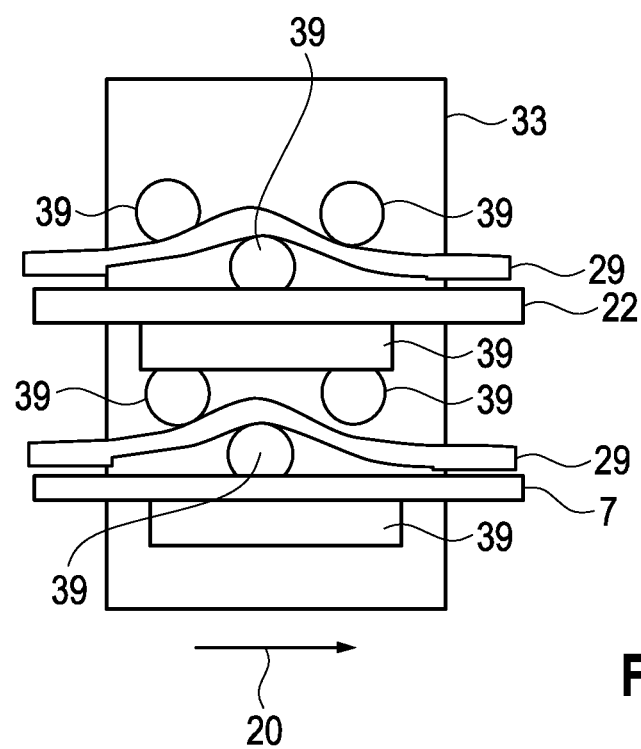
FIG. 13: the closing of the second clamping apparatus.

As can be seen in FIG. 13, the grippers 39 in this embodiment of the second clamping apparatus 33 are configured differently. For instance, there are grippers 39 with a round cross section and grippers 39 with a rectangular cross section. When the grippers 39 are then moved towards each other, the round grippers 39 are surrounded to an increasing degree by the strip of material that is between them; in this case, these are the two strips of material 27 of the separators 29. As a result, the effect occurs that the additional path length of the third strips of material 27 needed to surround the grippers is replenished from the outside. When the first clamping apparatus 32 is then closed, followed by the second clamping apparatus 33, then the loose end of the third strip of material 27, which is at the rear left-hand side of the partial stack 31, is replenished in the lengthwise direction 20, and thus pulled to the front or to the right as seen in the plane of the drawing.

Figure 14:
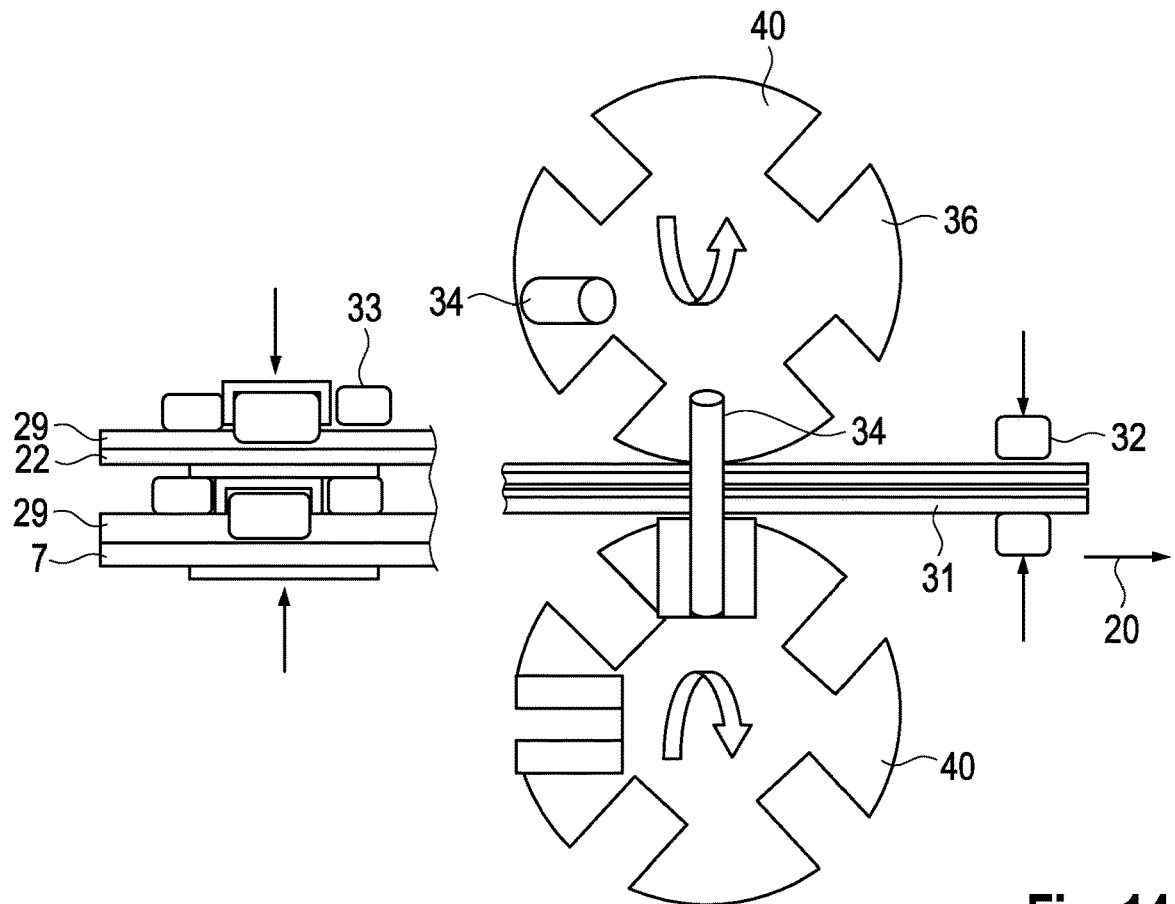
FIG. 14: a side view of a cam drive.

FIG. 14 shows the partial stack 31 with the replenished separators 29 as they pass through the cam drive 36. In this context, the transport pin 34 is extended and engages with an opposite cam wheel 40 and with the partial stack 31. The rotation of the two cam wheels 40 of the cam drive 36 causes the partial stack 31 to be conveyed further in the lengthwise direction 20. A second transportation pin 34 is shown in the upper cam wheel 40 in a retracted state and it is not yet engaged with the partial stack 31.

Figure 15:
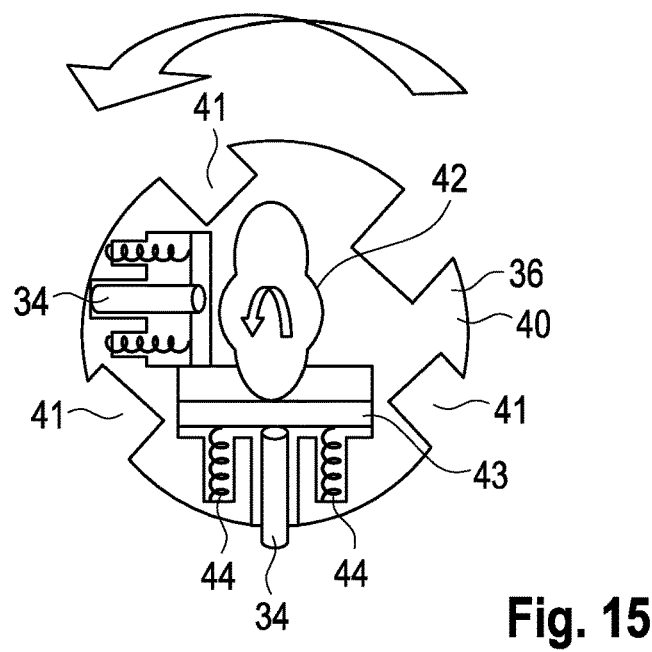
FIG. 15: a sectional depiction through a cam wheel of a cam drive.

FIG. 15 shows a cam wheel 40 of a cam drive 36 in a sectional view. The cam wheel 40 has extendable transport pins and recesses 41. Whereas the transport pins 34 serve to engage with the transport holes 17 of the strips of material, the recesses 41 serve to allow the first clamping apparatus 32 and the second clamping apparatus 33 to pass through the cam wheel 34 without any problems. Extending or retracting the transport pins 34 can be controlled particularly easily by means of a cam track 42 in that a plate 43 that is connected to the transport pins 34 is pressed against the cam track 42 by means of springs 44. In this context, the cam track 42 is configured in such a way that the transport pins 34 are extended precisely at the time when they can engage with a transport hole 17 during the course of the rotational movement of the cam wheel 40.

Figure 16:
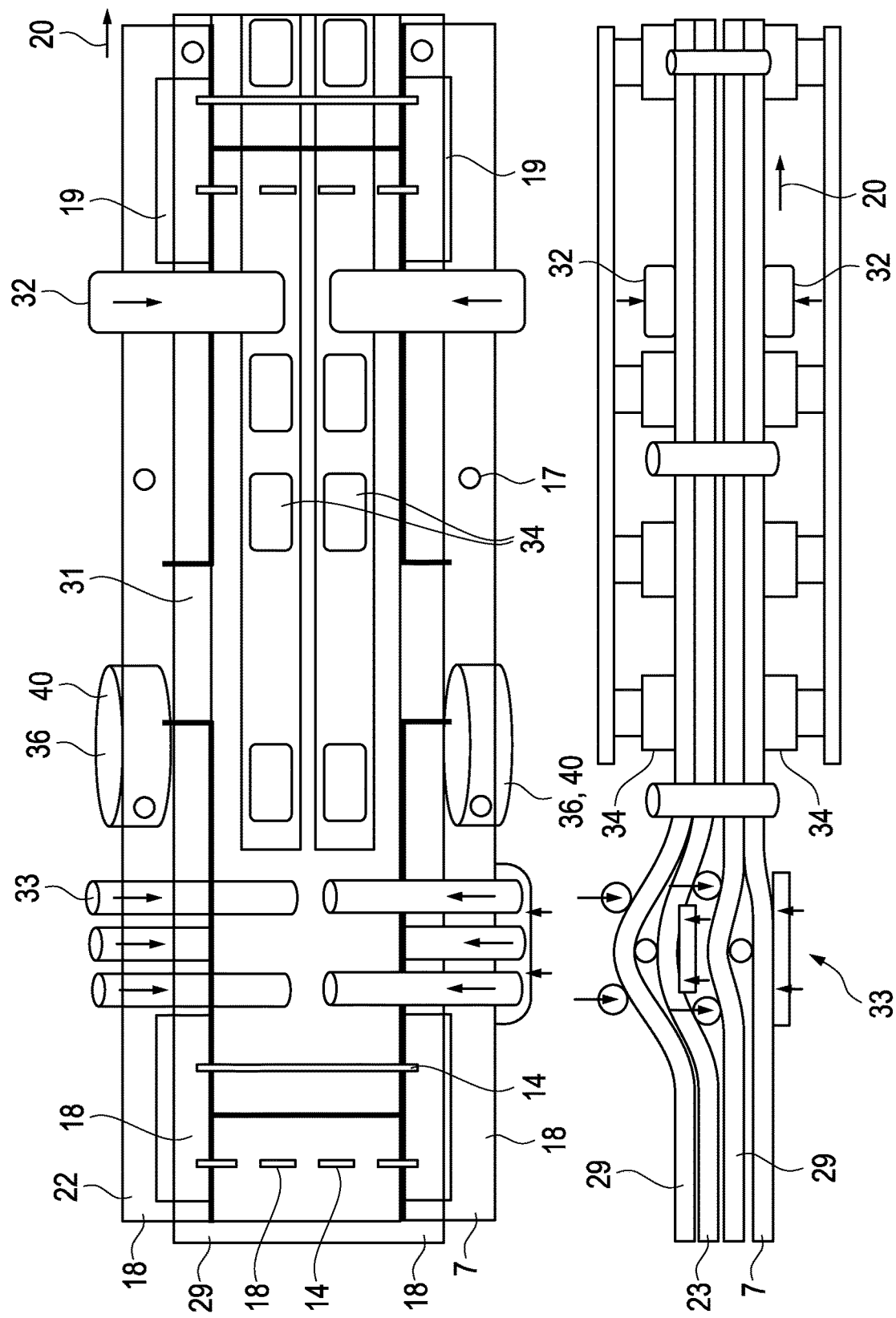
FIG. 16: a top view and a side view with a first, second and third clamping apparatus.

FIG. 16 shows a top view and a side view of the partial stack 31 as it passes through the cam drive 36. Here, the first clamping apparatus 32 and the second clamping apparatus 33 have been put in place. The transversal separating cut 14 into the separators 29 is shown here once with a broken line and once with a solid line. The broken line depicts the position of the separating cut 14 before the first clamping apparatus 32 and the second clamping apparatus 33 have been put in place. In this process, the first clamping apparatus 32 was put in place first and subsequently the second clamping apparatus 33. As a result, the additionally needed path length of the separators 29 when the second clamping apparatus 33 was put in place can only be replenished from the left-hand side, that is to say, from the third supply means 28. In accordance with this additionally replenished path length, the separating cut 14 indicated by the broken line has migrated to the right into the position of the separating cut 14 indicated by the solid line. This means that, during a continuous production process, a longer length of the third strip of material 27 is dispensed than the lengths of the first material strip 3 and of the second material strip 22 that have been dispensed by the first supply means 2 and by the second supply means 26, respectively. As a result, it is possible that, in its finished state, the separator 29 protrudes beyond the anode 7 and the cathode 23 not only in the transversal direction, but rather, also beyond them in the lengthwise direction 20, thus ensuring safe and reliable insulation. The lower area of FIG. 16 once again shows a side view of this section presented above. It can be clearly seen here how the second clamping apparatus 33 in its placed state increases the path lengths of the separators 29. This view also clearly shows that the transport sections 18 of the three material strips 3, 22, 27 are arranged so as to be clearly separated from each other in the transversal direction. Moreover, here too, the transport section 18 of the separators 29 is arranged so far towards the inside, that is to say, away from the edge 10, that it is inside the window 19. The laterally offset—in other words, offset in the transversal direction—arrangement of the transport sections 18 has several advantages in this respect. For instance, the transport pins 34 can engage on one side with the transport holes 17 of the anode 7 as well as with the transport holes 17 of the cathode 22 on the opposite side. Consequently, both material strips 3, 22 can be driven synchronously in that the drive forces necessary for this purpose, which are normally introduced into a material strip 3, 22, 27 as tensile forces, are transmitted to the material strips 3, 22.

Another advantage of the laterally offset arrangement of the transport sections 18 can be achieved if the transport section 18 of a material strip 3, 22, 27 such as, for example, the transport section 18 of the separator 29, is arranged in such a way that it is above at least one window 19 of the adjacent material strips 3, 22, such as, for instance, of the anode 7 or of the cathode 23. In this embodiment, the separator 29 can be cut at any desired place inside the window 19. To put it more precisely, towards this end, the transport section 18 of the separator is severed in the transversal direction at this position, which is freely selectable inside the window 19. For this purpose, it is merely necessary for the separating cut 14 that has been made in the separator 29 by the first cutting device 1 to be appropriately positioned inside the window 19. Once this has been done, as shown in the figure, then the transport section 18 that is still present in the separator can be severed transversally very easily in that the separating cut 14 is lengthened all the way to the side edge of the separator 29. This can be done very easily by means of a second cutting device 45 which is configured, for instance, as a roller punching device or as a roller cutting device. Within the scope of this second cut, it is then especially possible to make additional cuts such as, for example, exposing the arresters 25 by lengthening the arrester cut 16 all the way to the edge, or else by severing the lateral transport sections 18 from the anode 7 and from the cathode 23 by means of a cut in the lengthwise direction of the partial stack 31.

Figure 17:
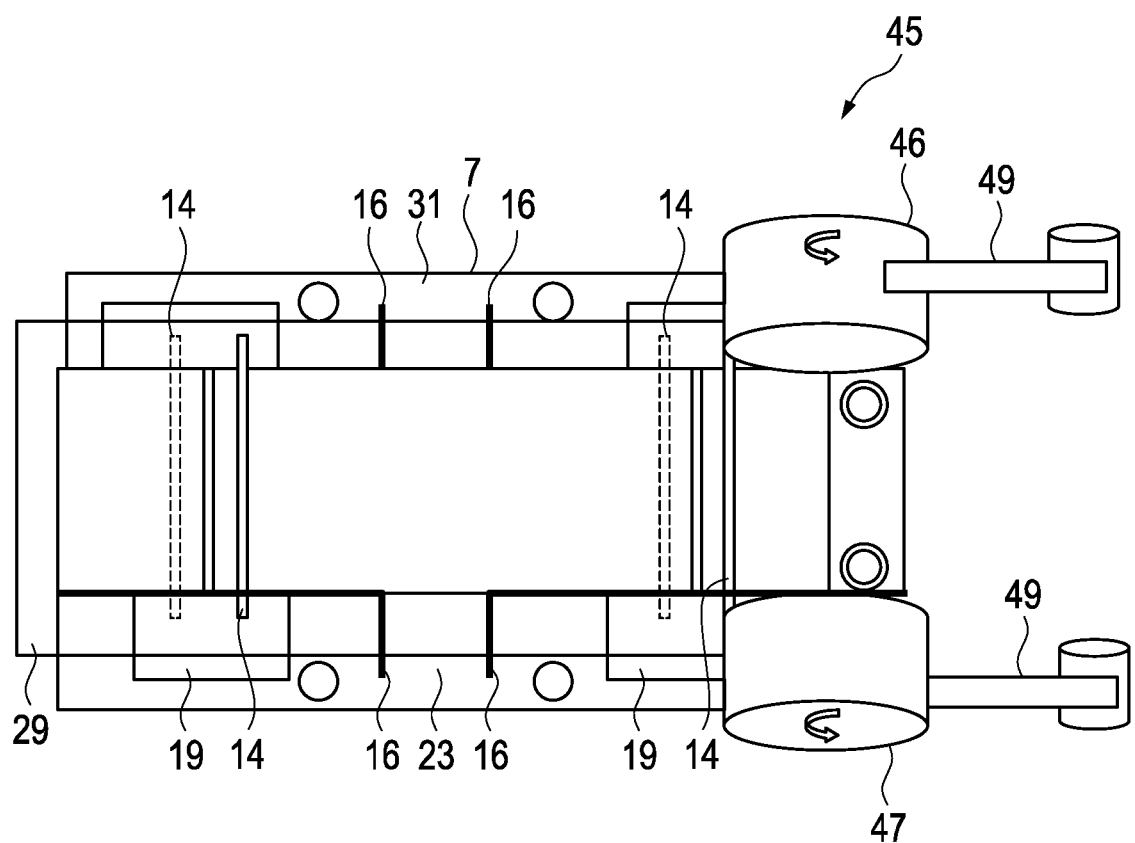
FIG. 17: a top view of a second cutting device.

FIG. 17 shows a second cutting device 45 in a top view. This second cutting device 45 makes a second cut in which the partial stack 31 is then also cut open in the transversal direction. In this context, the transport sections 18 that had been used until this point in time are then cut off. In the state shown here, the partial stack 31 is simultaneously held by the first, second and third clamping apparatuses 32, 33, 37, not shown here. In this context, owing to the placement of the second clamping apparatus 33, the separating cut 14 is shifted to the right, from the initial position indicated by the broken line to the position indicated by the solid line.

The second cutting device 45 has a first roller 46 and a second roller 47, both of which interact with a counter roller 48. In this process, the first roller 46 cuts the anode 7 and one side of the separators 29. The second roller 47 cuts the cathode 23 and the other side of the separators 29. The separators 29 are cut in that the separating cut 14 through the separator 29 is transversally lengthened in the area of the window 19, so that individual separators 29 that have now been divided in the lengthwise direction are formed from the continuous separators 29. Only now can the separator 29 be cut through the window 19 separately from the electrodes.

Moreover, the anode 7 and the cathode 23 undergo the final cut in that the appertaining arrester cuts 16 from the first roller 46 or from the second roller 47 are either lengthened transversally outwards to the edge 10 or else severed by means of a longitudinal cut running in the lengthwise direction. Ribbons 49 are then cut off by the longitudinal cut. Both cuts, that is to say, in the transversal direction and in the longitudinal direction, can also be made simultaneously.

Figure 18:
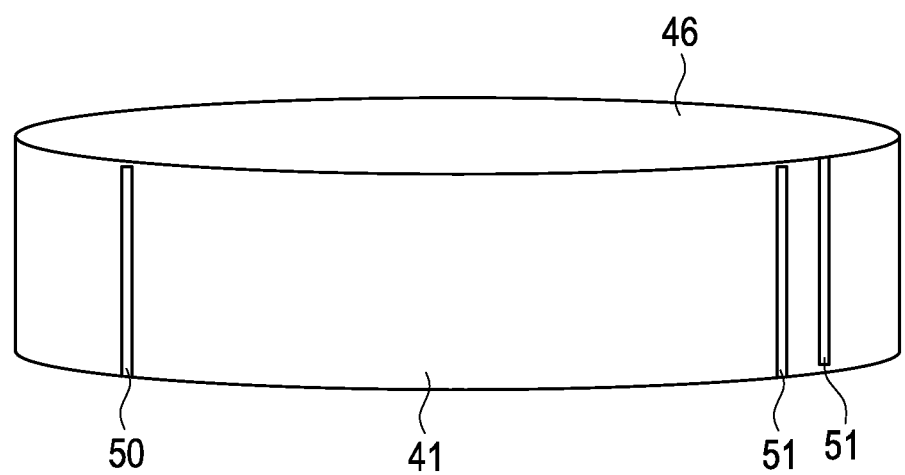
FIG. 18: a diagonal view of a first roller of a second cutting device.

FIG. 18 shows the first roller 46 in an enlarged view. The roller 46 here has recesses 41 so that the first and second clamping apparatuses can pass through them without any problem. Moreover, there are separator blades 50 for lengthening the separating cuts 14 in the separators 29, and arrester blades 51 for lengthening the arrester cuts 16. Furthermore, a radially arranged blade can be provided on one of the rollers 46, 47, 48 in order to cut off the ribbons 49 in the same work step.

Figure 19:
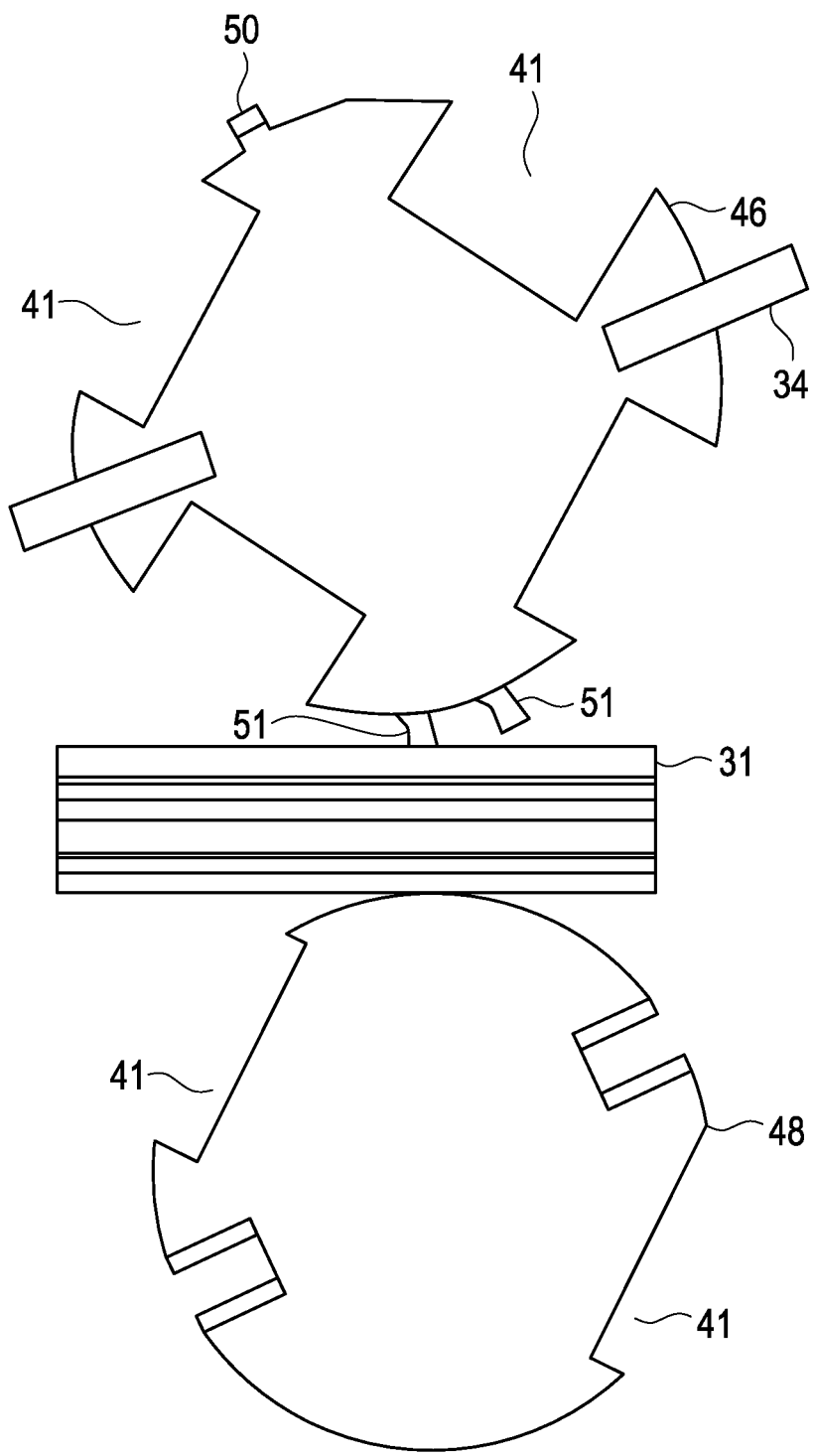
FIG. 19: a side view of a second cutting device.

FIG. 19 once again shows the first roller 46 together with the counter roller 48, between which there is a partial stack 31. The counter roller 48 as well as the first roller 46 have recesses 41 in order to ensure easy passage of the first clamping apparatus 32 and of the second clamping apparatus 33. Moreover, the first roller 46 has transport pins 34 that engage with the transport sections 18 of the anode 7 or of the cathode 23 and that ensure reliable transport as long as the transport sections 18 have not yet been cut off. In order to make the second cut, the first roller 46 has a separator blade 50 and two arrester blades 51 with which the separating cut 14 in the separators 29 can be lengthened and the arresters 25 can be exposed.

Figure 20:
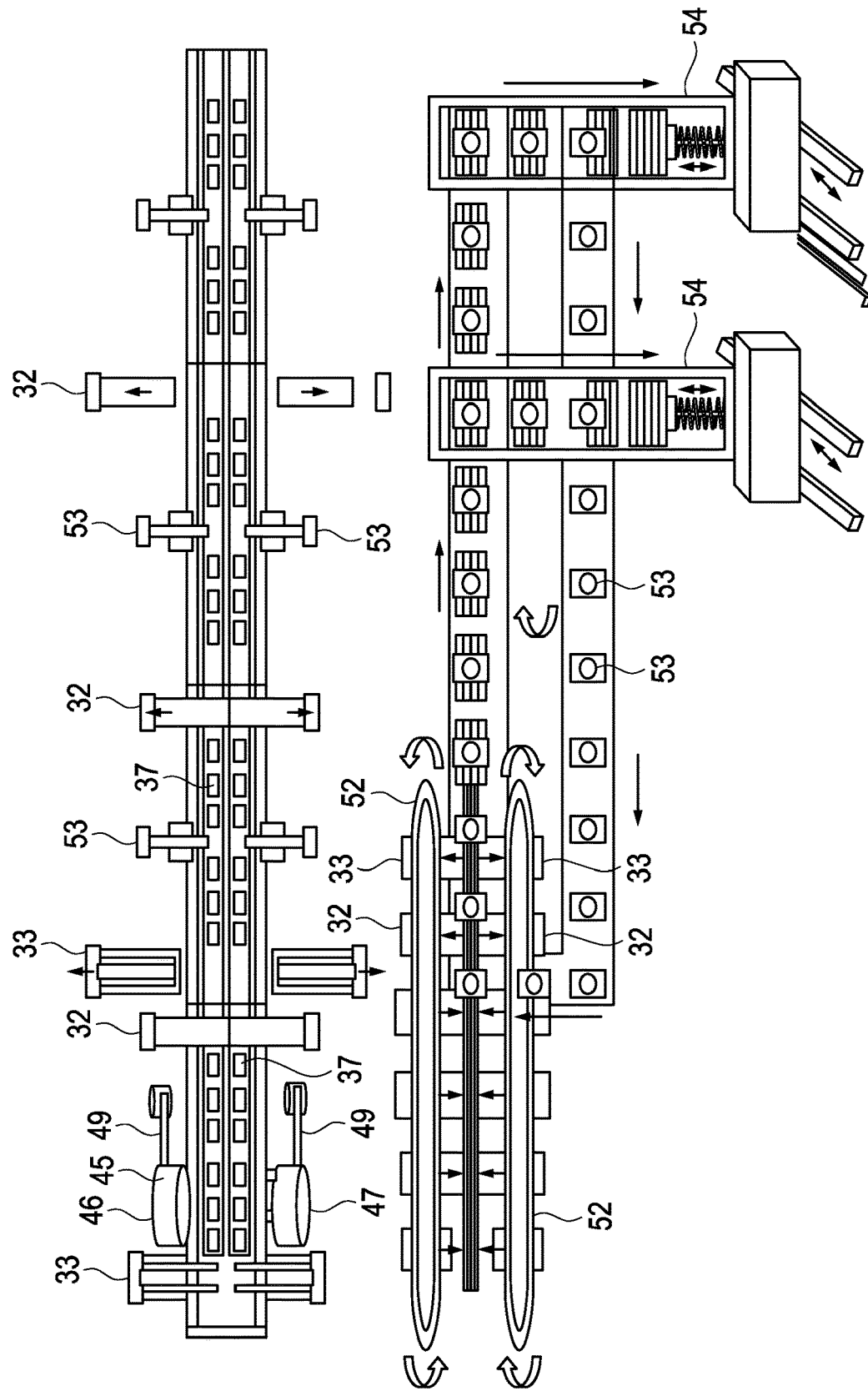
FIG. 20: a top view and a side view with a second cutting device and two magazines.

FIG. 20 shows a top view of the second cutting device 45. Here, as seen from left to right, initially the third clamping apparatus 37 is activated simultaneously with the first clamping apparatus 32 and with the second clamping apparatus 33. Over the further course of the movement of the partial stack 31 towards the right, then the second clamping apparatus 33 and subsequently the first clamping apparatus 32 are opened, so that the replenished separators 29 can move from the surrounded position in the second clamping apparatus 33 back to a flat position and parallel to the anode 7 or the cathode 22. In this process, the separating cuts 14—located in the rear as seen in the lengthwise direction 20—that were made to create the separators 29 move away from the appertaining arresters 25, thereby reliably protruding beyond the anode 7 or the cathode 22, also in the lengthwise direction.

After the first clamping apparatus 32 and the second clamping apparatus 33 have been opened, they are then moved by conveyor belts 52 back to their initial position where they can once again be placed against a partial stack 31. At the same time, gripping means 53 are placed against the partial stacks 31 so that these can be further transported to magazines 54 and stacked there once the third clamping apparatus 37 has been opened. Like the clamping apparatuses 32, 33 and 37, the gripping means 53 also work in one recurring process in order to allow a fast and continuous production of the cell stacks 57.

Figure 21:
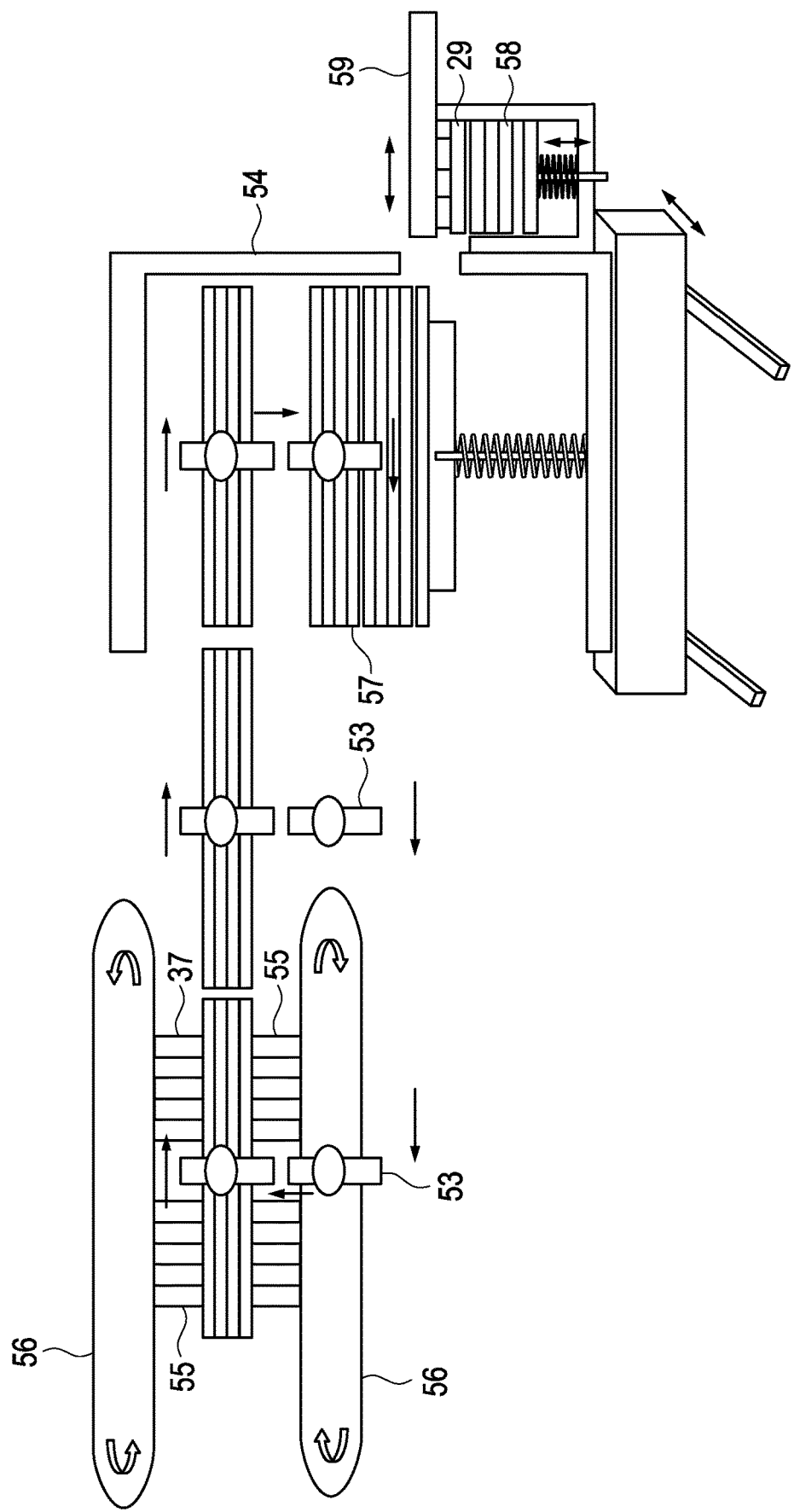
FIG. 21: a side view of the third clamping apparatus, the gripping means and a magazine.

FIG. 21 shows the third clamping apparatus 37 in a side view. The third clamping apparatus 37 likewise has a plurality of clamping elements 55 that are attached to a second conveyor belt 56, whereby the second conveyor belt 56 moves at the same speed as the speed with which the partial stack 31 is being transferred by the first clamping apparatus 32 and by the second clamping apparatus 33. After the transfer of the partial stack 31 to the gripping means 53, the clamping elements 55 are then moved downwards or upwards and then once again moved to the left in a counter movement, where they are then once again placed onto the next partial stack 31. As the next step, the gripping means 53 feed the partial stack 53 to a magazine 54 where several partial stacks 31 are stacked on top of each other in order to form a cell stack 57.

Since the partial stacks 31 consist of four strips of material which comprise an anode 7, a separator 29, a cathode 22 and another separator 29 and which are arranged on top of each other from the bottom to the top in this sequence, first of all, a single separator 29 is inserted into the empty magazine 54. This single separator 29 serves to prevent the anode 7 that is at the bottom on the partial stack 31 from making electric contact with other components. Towards this end, a supply of individual separators 29 is kept ready on the magazine 54 in a receptacle 58. In this context, every time an empty magazine 54 is about to be filled, a feeding means 59 uses, for example, a vacuum lifting tool to place a separator 29 into the magazine 54 as the first strip of material. Once the cell stack 57 is complete, the magazine 54 is moved and replaced by another empty magazine 54. While this second magazine 54 is being filled, the cell stack 57 in the first magazine 54 can be bound to form a cell packet 60 and can subsequently be taken away. At higher production speeds, it is also possible to employ several magazines 54. Towards this end, for instance, two additional magazines 54 can be provided which are arranged parallel to the first two magazines and which can be filled with partial stacks 31 by means of gripping means 53 that have a greater range. In this context, when the additional magazines 54 are in the empty state, they can be replenished with a separator 29 by the feeding means 59. This allows the production to proceed without interruptions and at a high speed.

Figure 22:
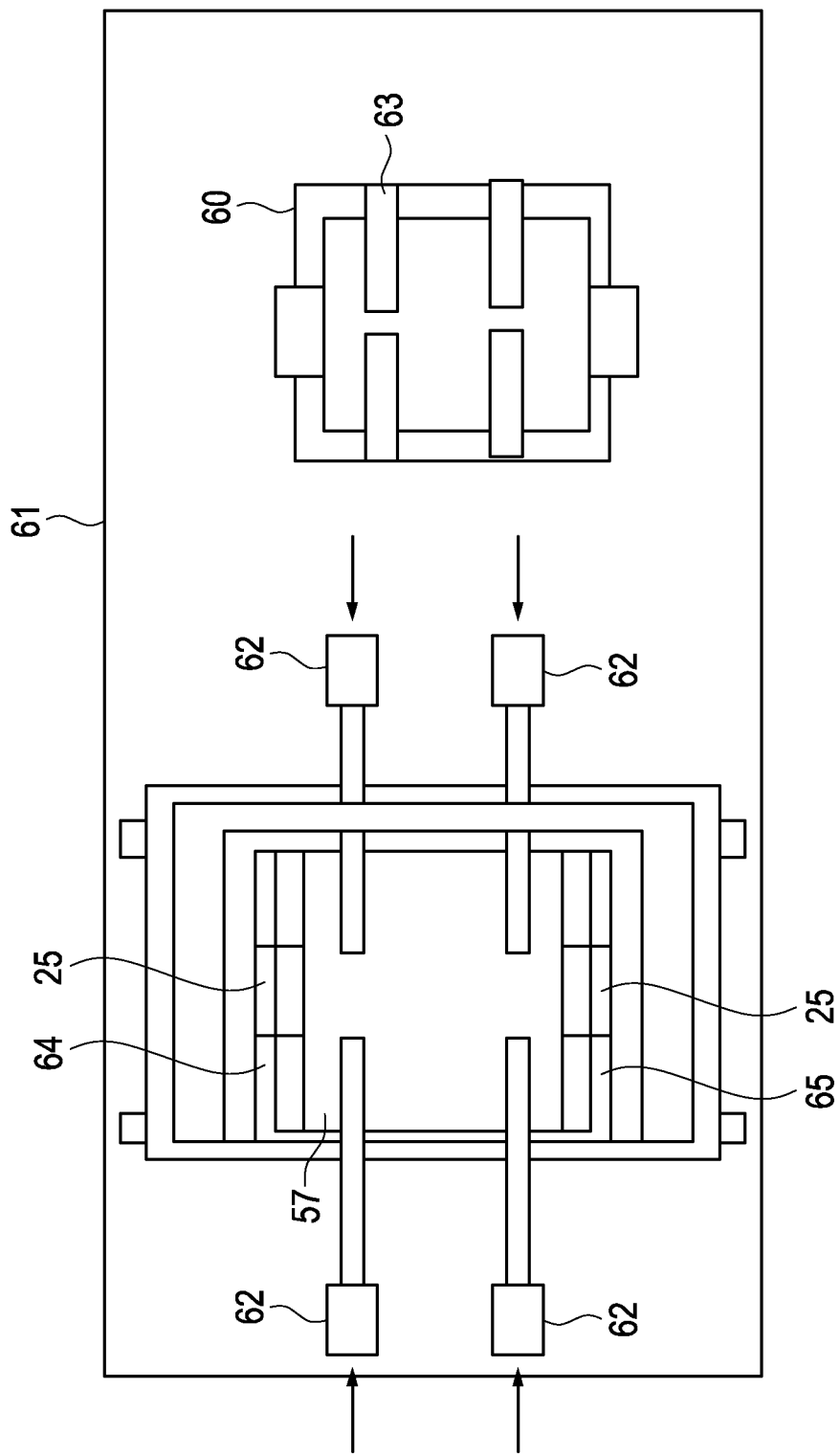
FIG. 22: a top view of a conveyor belt with a finished and an unfinished cell packet.

On the left-hand side, FIG. 22 shows a top view of a filled magazine 54, comprising a cell stack 57 above a conveyor belt 61. To the right of it, a finished cell packet 60 that is ready to be taken away is shown on the conveyor belt 61. Pushers 62 serve to bind the cell stack 57 with an adhesive tape 63 in order to form a firm cell packet 60. In this context, the end faces 64 of the cell stack 57 are held inside the magazine 54 where the arresters 25 are also located.

Figure 23:
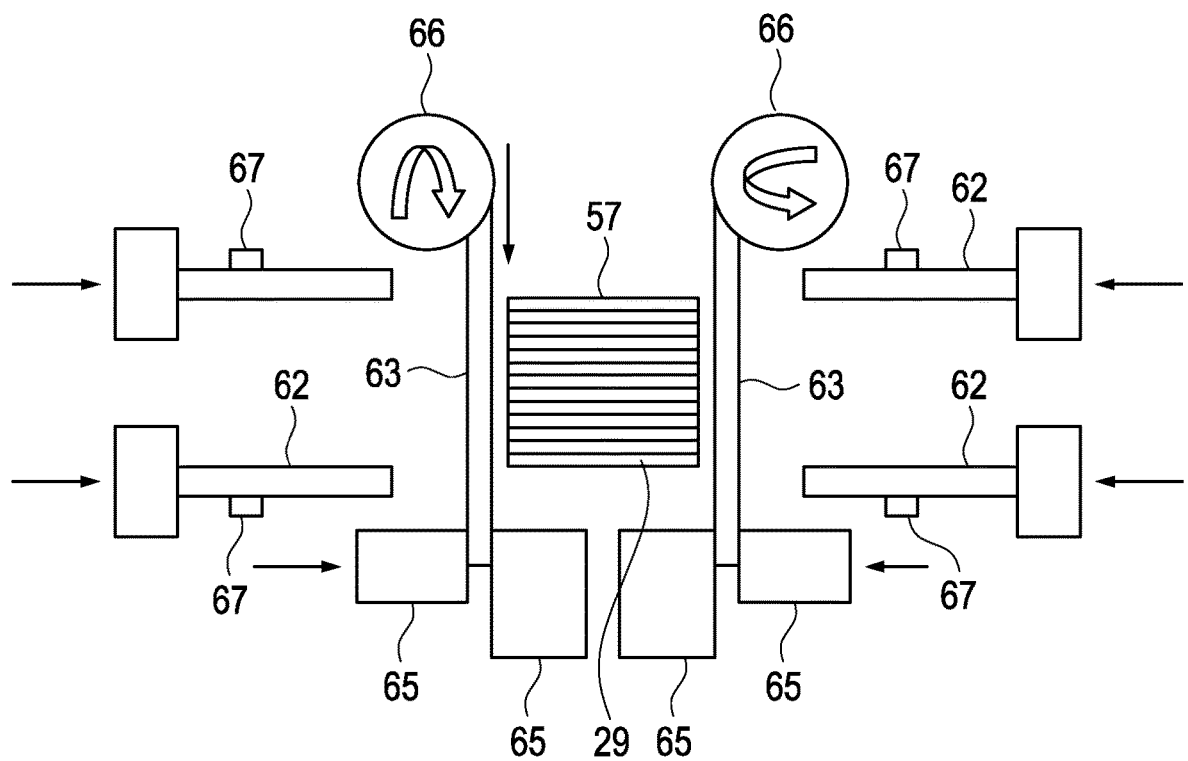
FIG. 23: a side view of a first step for gluing the cell stack.

FIG. 23 illustrates the first step in the gluing operation. In this context, the pushers 62 are initially moved sideways to the outside and four adhesive tapes 63 are pulled from adhesive tape rolls 66 by means of adhesive pull tabs 65.

Figure 24:
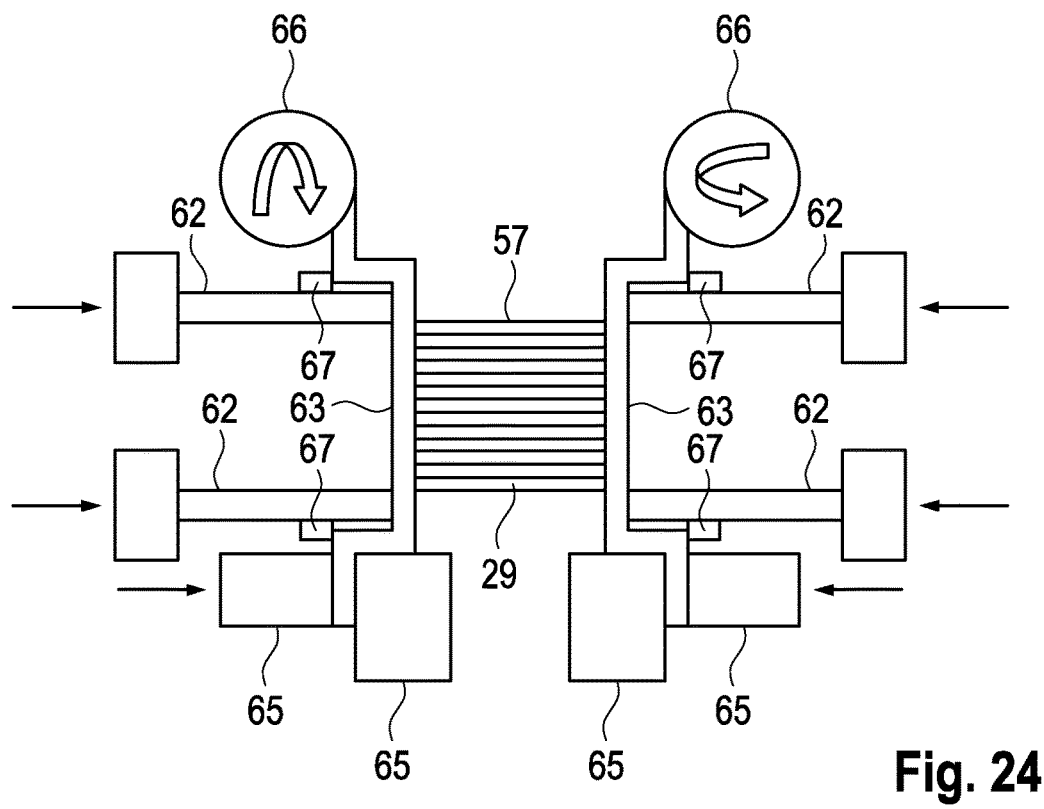
FIG. 24: a side view of a second step for gluing the cell stack.

FIG. 24 shows the second step in which the pushers 62 are moved up to the cell stack 57 and they then press the adhesive tape 63 against the cell stack 57 from the side. In this process, the adhesive tapes 63 are simultaneously cut by blades 67 that are arranged on the pushers 62. During the cutting procedure, the adhesive pull tabs 65 at the same time function as counter supports for the blades 67.

Figure 25:
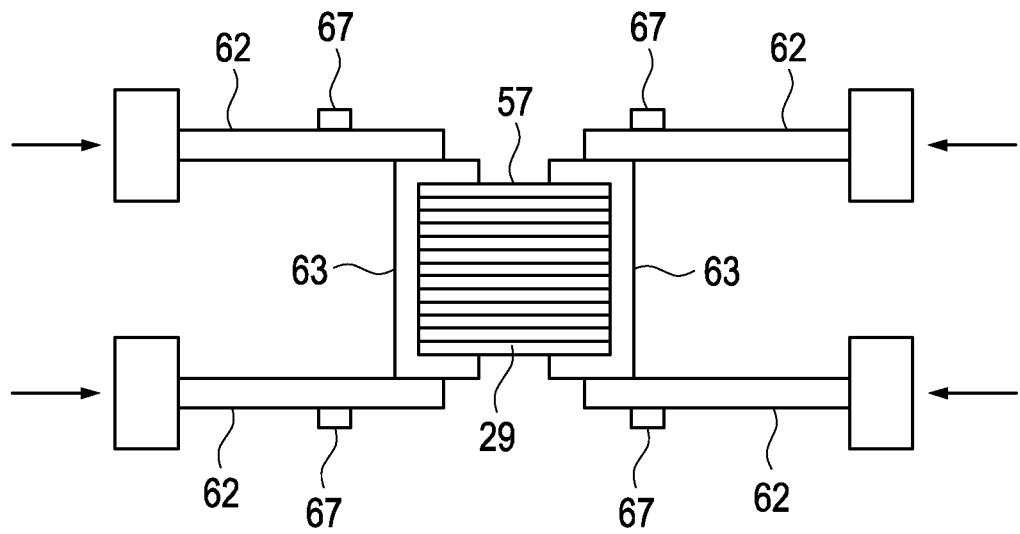
FIG. 25: a side view of a third step for gluing the cell stack.

FIG. 25 shows how the pushers 62 are subsequently moved further in the direction of the cell stack 57 and, in this process, they press the cut adhesive tapes 63 onto the cell stack 57 so that a cell packet 60 is formed.

Figure 26:
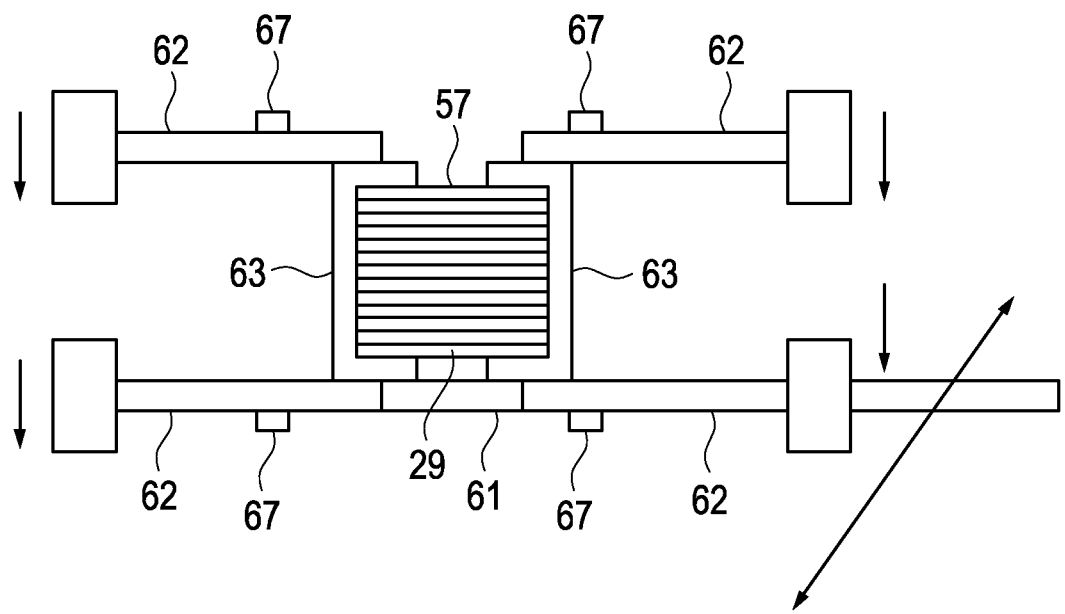
FIG. 26: a side view of a fourth step for gluing the cell stack.

Subsequently, as shown in FIG. 26, the cell packet 60 thus formed is placed onto the transport belt 61 and taken away.

Figure 27:
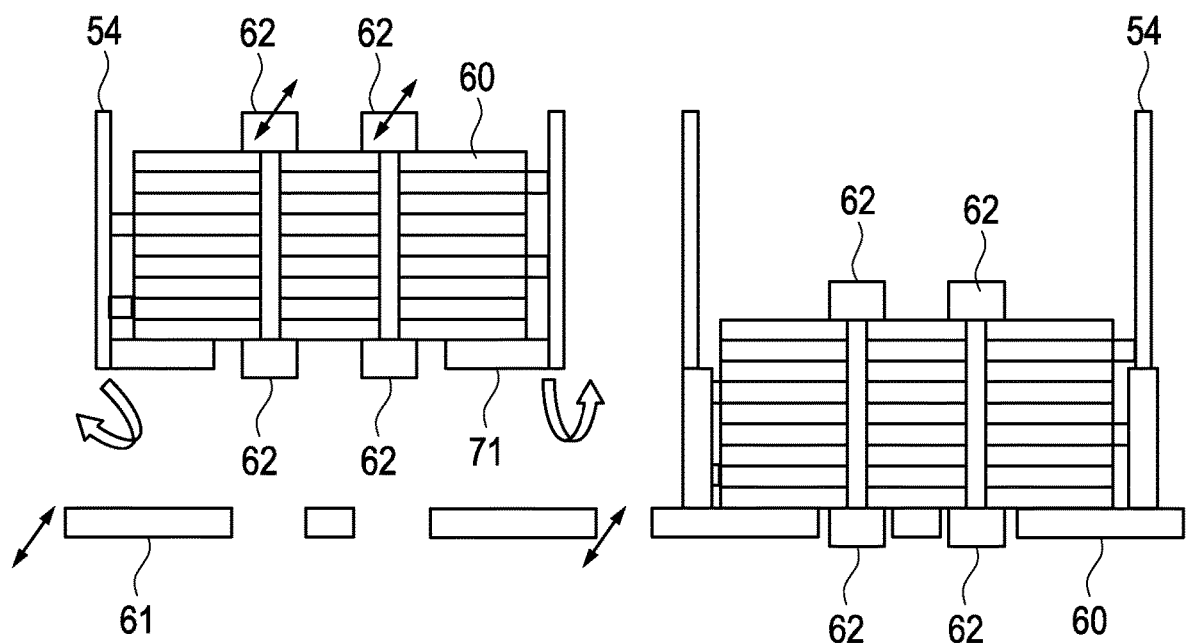
FIG. 27: a side view of the placement of a cell packet on the conveyor belt.

FIG. 27 shows how a bottom 71 of the magazine 54 then opens by being swiveled away downwards, after which the pushers 62 place the cell packet 60 onto the transport belt 61.

Figure 28:
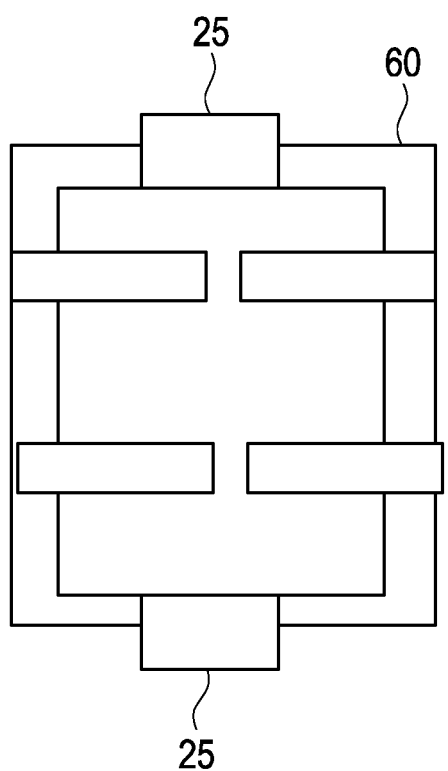
FIG. 28: a top view of a finished cell packet.

FIG. 28 shows a finished cell packet 60 with the arresters 25 and the surrounding adhesive tape 63.

Figure 29:
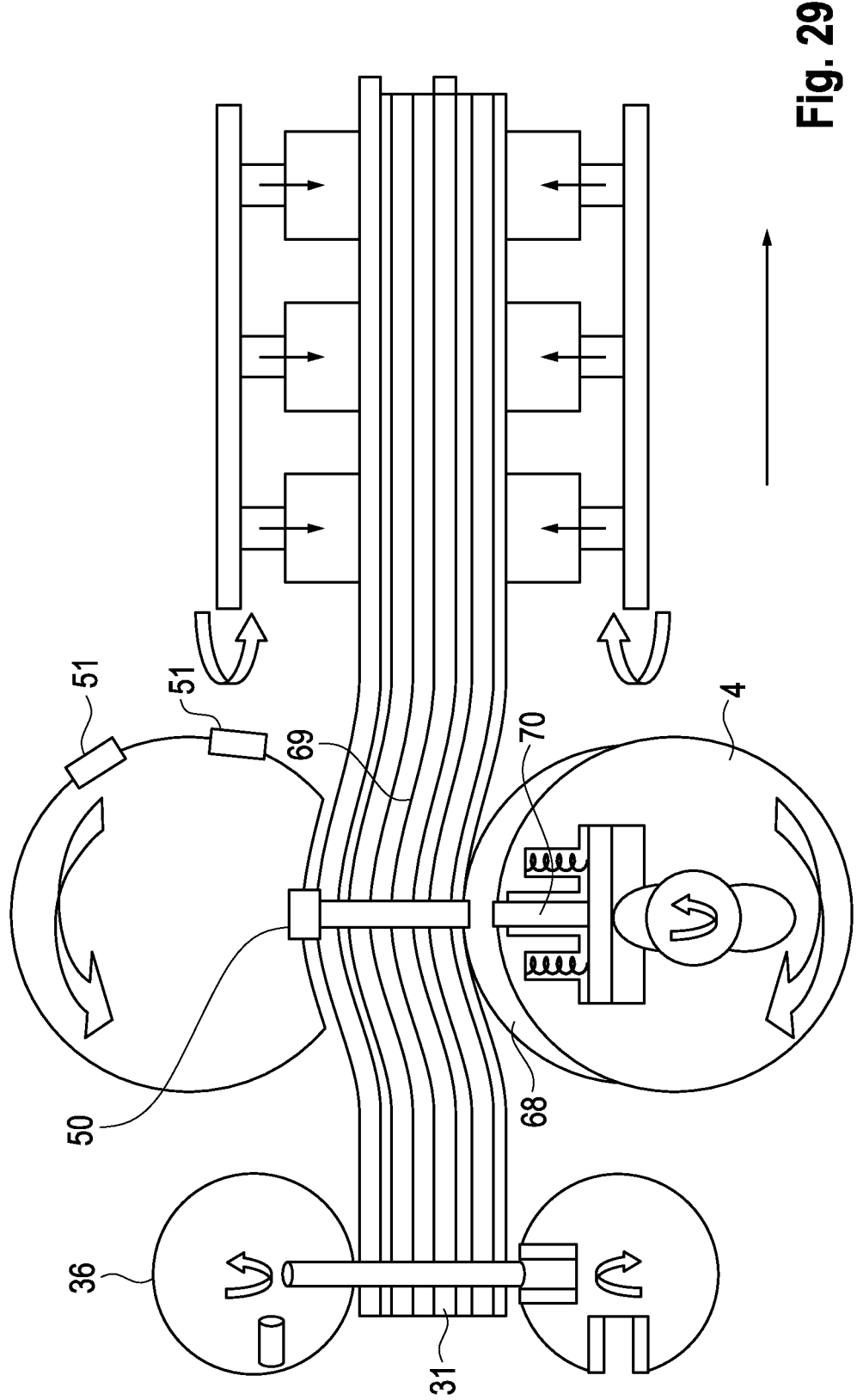
FIG. 29: an alternative embodiment of a second cutting device.

Finally, FIG. 29 shows an alternative embodiment that can perform the function of a first and a second clamping apparatus 32, 33 as well as of a second cutting device 45. Depicted here is a partial stack 31 that has already passed through a first cutting device 1 and is now being transported by the cam drive 36 to the second cutting device 45. In this process, a bottom roller 4 is used that can be configured, for example, as a cam-driven counter roller having a shaping stamp 68 made of rubber. Here, the shaping stamp 68 is configured in such a way that, when a separating cut 14 of a separator 29 enters the second cutting device 45, the partial stack 31 is forced into a curved movement trajectory 69 over the approximately elliptical, not circular, shaping stamp 68. The curvature generated in this process is once again reinforced in that, in this position, the shaping stamp 68 is additionally deformed by a pin 70 in the direction of the partial stack 31. As a result, the material strips 3, 22, 27 can be bent, a procedure which, in this state, also brings about a shifting of these material strips 3, 22, 27 relative to each other. If the separators 29 in this position are then severed by means of the separator blade 50 arranged on the top roller 5, then a separator 29 is obtained that is longer than the anode 7 or cathode 23 situated underneath it. Subsequently, the arrester cuts 16 can be made by means of the following arrester blades 51, whereby the partial stack 31 does not undergo any curvature in this rotational position of the top roller 5 and of the bottom roller 4 since, in this subsequent rotary position, the shaping stamp 68 is not positioned against the partial stack 31. This means that the arrester cuts 16 are made by means of the arrester blades 51 on a straight and elongated partial stack 31.

The present invention allows four works steps to be carried out in one installation. These work steps consist of the longitudinal cutting, the crosswise cutting, the stacking and the gluing or taping of the cell stacks.

Moreover, very high stacking speeds can be attained, whereby the preferably four strips of material are continuously secured by a clamping apparatus 32, 33, 37 or by a gripping means 53, which translates into very high positioning and manufacturing accuracy.

The strips of material do not have to first be individuated and then joined again, as a result of which very little material handling is needed and very good material utilization is achieved in comparison to, for example, accordion folding.

Owing to the high positioning accuracy, it is also possible to reliably ensure the oversize of, for instance, 6 mm, that is needed for the separator 29 vis-à-vis the cathode 23.

Finally, otherwise customary lamination processes can be dispensed with, as a result of which there is no need to use expensive lamination-capable separators 29.

LIST OF REFERENCE NUMERALS 1 first cutting device
2 first supply means
3 first strip of material
3a, 3b divided first strip of material
4 bottom roller
5 top roller
6 perforating unit
7 anode
8 battery cell
9 anode area
10 edge
11 rotary blade
12 longitudinal cut
13 receiving holes
14 separating cut
15 window cut
16 arrester cut
17 transport hole
18 transport section
19 window
20 lengthwise direction
21 width
22 second strip of material
22a, 22b divided second strip of material
23 cathode
24 cathode area
25 arrester
26 second supply means
27 third strip of material
28 third supply means
29 separator
30 guide means
31 partial stack
32 first clamping apparatus
33 second clamping apparatus
34 transport pin
35 receiving pin
36 cam drive
37 third clamping apparatus
38 monitoring instrument
39 gripper
40 cam wheel
41 recess
42 cam track
43 plate
44 spring
45 second cutting device
46 first roller
47 second roller
48 counter roller
49 ribbon
50 separator blade
51 arrester blade
52 conveyor belt
53 gripping means
54 magazine
55 clamping element
56 second conveyor belt
57 cell stack
58 receptacle
59 feeding means
60 cell packet
61 transport belt
62 pusher
63 adhesive tape
64 end face
65 adhesive pull tabs
66 adhesive tape roll
67 blade
68 shaping stamp
69 movement trajectory
70 pin
71 bottom

The invention claimed is:

1. A method for manufacturing a partial stack of a cell stack for battery cells, said method comprising at least the following steps:
 a) feeding in at least a first elongated material strip comprising a first material;
 b) feeding in a second elongated material strip comprising a second material;
 c) making a first initial cut into the first material strip, forming in the first material strip a continuous transport section having tensile strength which absorbs tensile forces in a longitudinal direction of the first material strip;
 d) making a second initial cut into the second material strip, forming in the second material strip a continuous transport section having tensile strength which absorbs tensile forces in a longitudinal direction of the second material strip;
 e) combining the first material strip and the second material strip to form an elongated partial stack, such that, after the material strips have been combined, the transport section of the second material strip is arranged offset in the crosswise direction relative to the transport section of the first material strip; and
 f) making a second cut, whereby the transport sections of the first and second material strips are cut independently of each other at first and second separating cuts, respectively, that are offset, at least in the crosswise direction or additionally in the length wise direction, so that the respective transport section is cut through crosswise and a complete division of the partial stack is produced in the crosswise direction.

2. The method according to claim 1, whereby the first and second elongated material strips have different dimensions, at least in the crosswise direction.

3. The method according to claim 1, whereby a window section is created in at least one material strip, the window section being selected in such a way that the separating cut of the transport section of at least one other material strip is within the window section.

4. The method according to claim 1, whereby, after the second cut, at least two partial stacks are arranged so as to form a cell stack.

5. The method according to claim 4, whereby the partial stacks consist of at least four material strips.

6. The method according to claim 1, whereby arrester lugs are formed on at least two material strips during the cutting.

7. The method according to claim 1, whereby the cell stack is joined to form a cell packet using a joining means.

8. The method according to claim 4, whereby at least one additional material strip is arranged in the cell stack while the partial stacks are arranged to form the cell stack.

9. A battery cell having a cell stack, produced according to claim 1.

10. A motor vehicle having at least one battery cell according to claim 9.

11. The method according to claim 1, wherein the transport sections of the first and second material strips are, at least until the crosswise second cut, continuous along the respective strip.

12. The method according to claim 1, wherein the step of making a first initial cut comprises cutting the first elongated material strip in at least the longitudinal direction.

13. The method according to claim 1, wherein the step of making a second initial cut comprises cutting the second elongated material strip in at least the longitudinal direction.

* * * * *